US011635882B2

(12) United States Patent
Noh et al.

(10) Patent No.: US 11,635,882 B2
(45) Date of Patent: Apr. 25, 2023

(54) MOBILE TERMINAL AND CONTROL METHOD THEREFOR

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/033,534

(22) Filed: Sep. 25, 2020

(65) Prior Publication Data
US 2022/0057919 A1 Feb. 24, 2022

(51) Int. Cl.
*G06F 3/04842* (2022.01)
*G06F 3/0486* (2013.01)
*G06F 1/16* (2006.01)

(52) U.S. Cl.
CPC ........ *G06F 3/04842* (2013.01); *G06F 1/1652* (2013.01); *G06F 3/0486* (2013.01)

(58) Field of Classification Search
CPC .... G06F 3/048; G06F 3/04842; G06F 3/0486; G06F 1/16–206; G06F 1/1613–1698; G06F 1/1624; G06F 2203/04803; G06F 1/1647–165; G06F 1/1652; H04M 1/0235–0239; H04M 1/0208–0239
See application file for complete search history.

(56) References Cited

U.S. PATENT DOCUMENTS 10,416,883 B2 * 9/2019 Kim ...................... G06F 3/0416
10,990,208 B2 * 4/2021 Jung ...................... G09G 5/003
(Continued)

FOREIGN PATENT DOCUMENTS

KR 1020150011691 2/2015
KR 1020170000553 1/2017
(Continued)

OTHER PUBLICATIONS

PCT International Application No. PCT/KR2020/011032, International Search Report dated May 14, 2021, 10 pages.
(Continued)

*Primary Examiner* — Liang Y Li
(74) *Attorney, Agent, or Firm* — Lee, Hong, Degerman, Kang & Waimey PC

(57) ABSTRACT

A mobile terminal and a control method therefor are disclosed. The mobile terminal includes a body, a communication unit configured to externally transmit and receive a signal, an input unit configured to receive user input, a display coupled to the body to vary a display region viewed from a front face of the body according to switching between an enlarged display mode and a reduced display mode, and a controller. The controller outputs a message pop-up window and a button corresponding to a notification upon receiving the notification while a first application is being output on the display, receives a first signal for selecting the button, outputs a preview pop-up window for a second application corresponding to the notification while the first signal is maintained, and outputs the second application in a first region when a dragged distance according to the first signal exceeds a first threshold value.

16 Claims, 27 Drawing Sheets

(56) References Cited

U.S. PATENT DOCUMENTS

| | | | | |
|---|---|---|---|---|
| 2015/0031417 A1* | 1/2015 | Lee | .................... | G06F 3/04855 |
| | | | | 455/566 |
| 2015/0186016 A1* | 7/2015 | Li | ..................... | G06F 3/04847 |
| | | | | 715/765 |
| 2016/0048320 A1* | 2/2016 | Han | ................... | G06F 3/04883 |
| | | | | 715/765 |
| 2016/0378270 A1* | 12/2016 | Lee | ..................... | G06F 3/0481 |
| | | | | 715/788 |
| 2017/0329472 A1* | 11/2017 | Kim | ................... | G06F 3/04883 |
| 2019/0012008 A1* | 1/2019 | Yoon | ................... | G06F 1/1643 |
| 2019/0261519 A1* | 8/2019 | Park | ................. | G02F 1/133305 |
| 2020/0042171 A1* | 2/2020 | Tao | ..................... | G06F 9/451 |
| 2020/0326839 A1* | 10/2020 | Walkin | ................. | G06F 3/0486 |
| 2021/0034210 A1* | 2/2021 | Chung | ................. | G06F 3/0488 |

FOREIGN PATENT DOCUMENTS

| | | |
|---|---|---|
| KR | 1020170127809 | 11/2017 |
| KR | 1020190101184 | 8/2019 |

OTHER PUBLICATIONS

European Patent Office Application Serial No. 20211302.3, Search Report dated May 10, 2021, 14 pages.

\* cited by examiner

FIG. 6
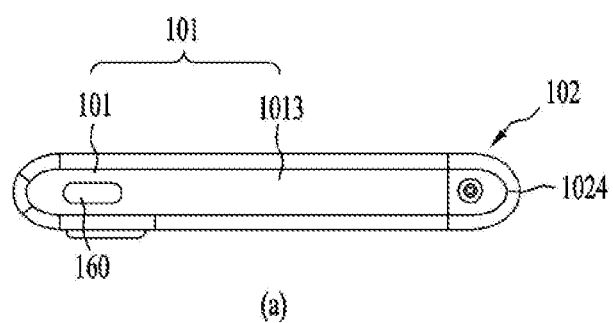
(a)
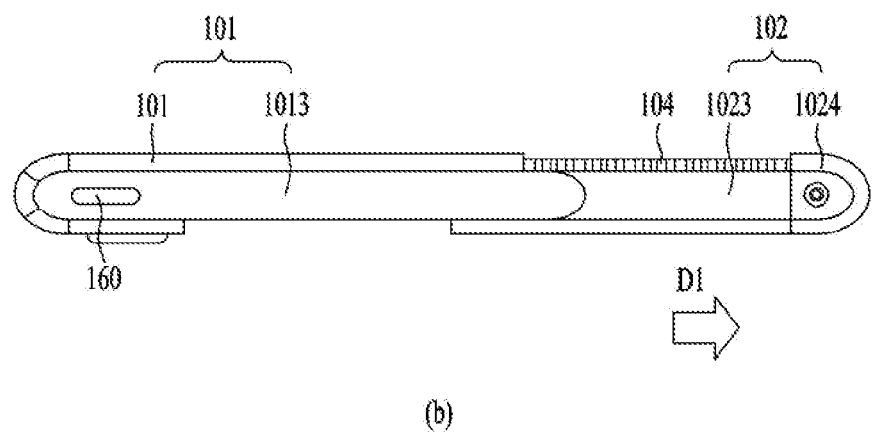
(b)

FIG. 7
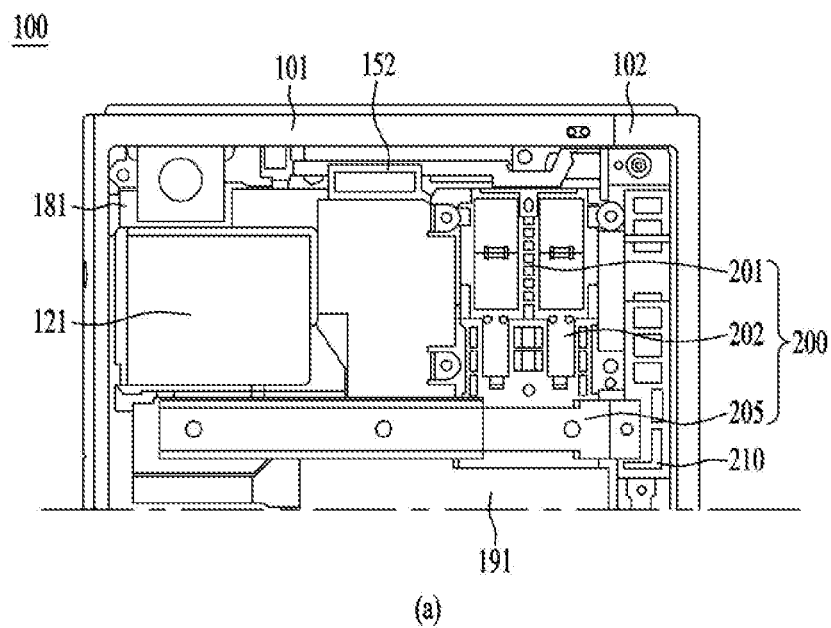
(a)
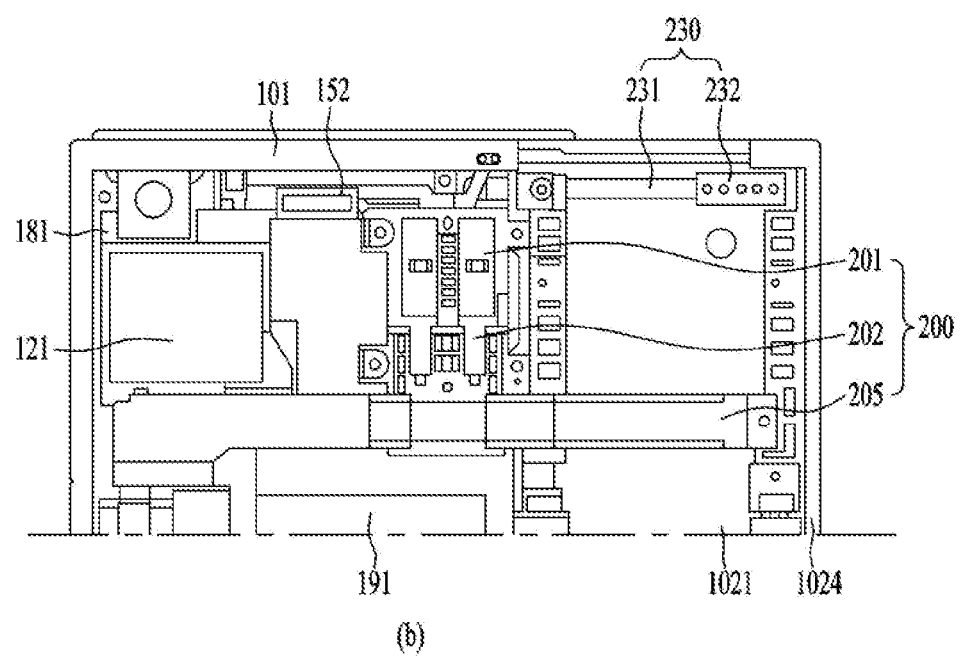
(b)

FIG. 8
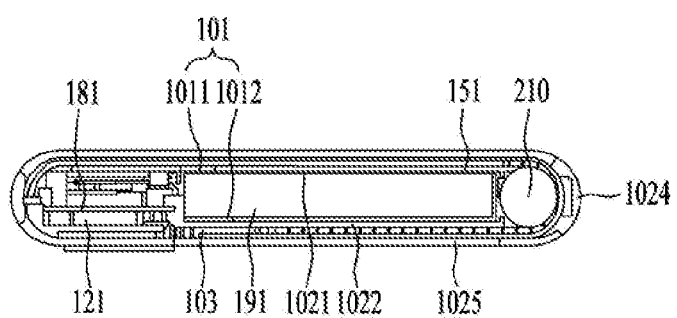
(a)
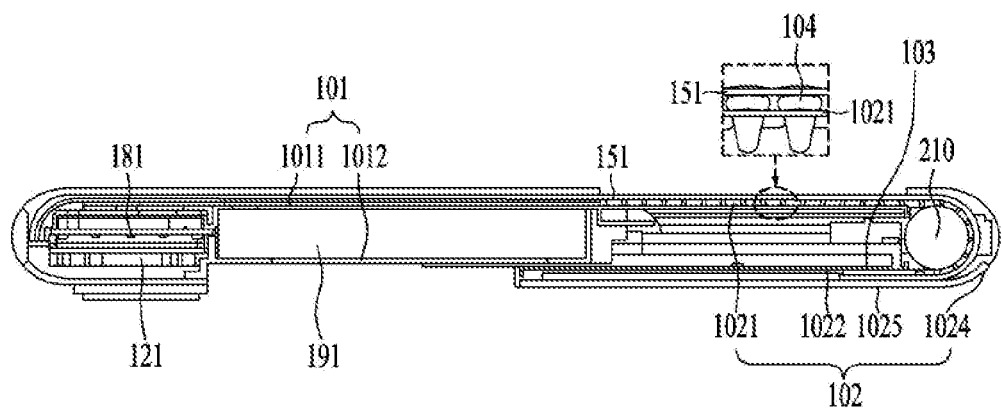
(b)

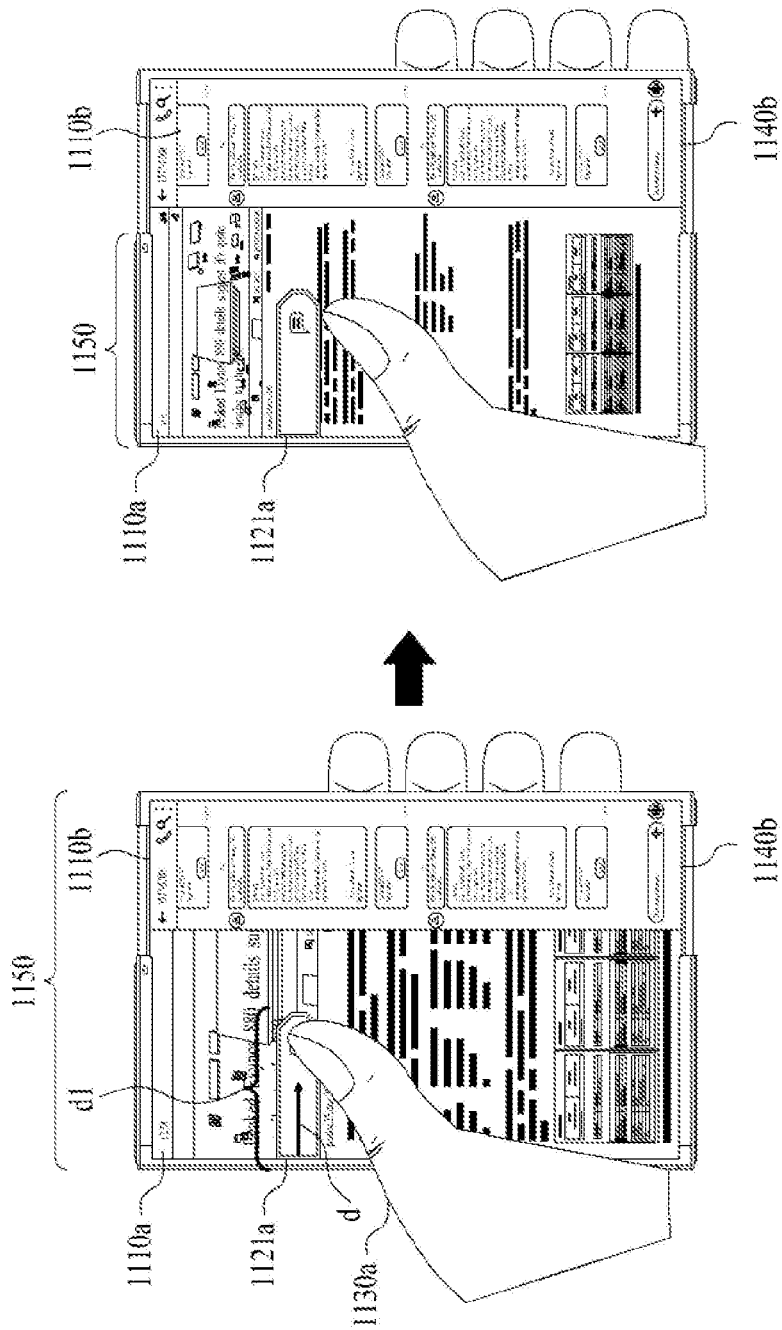

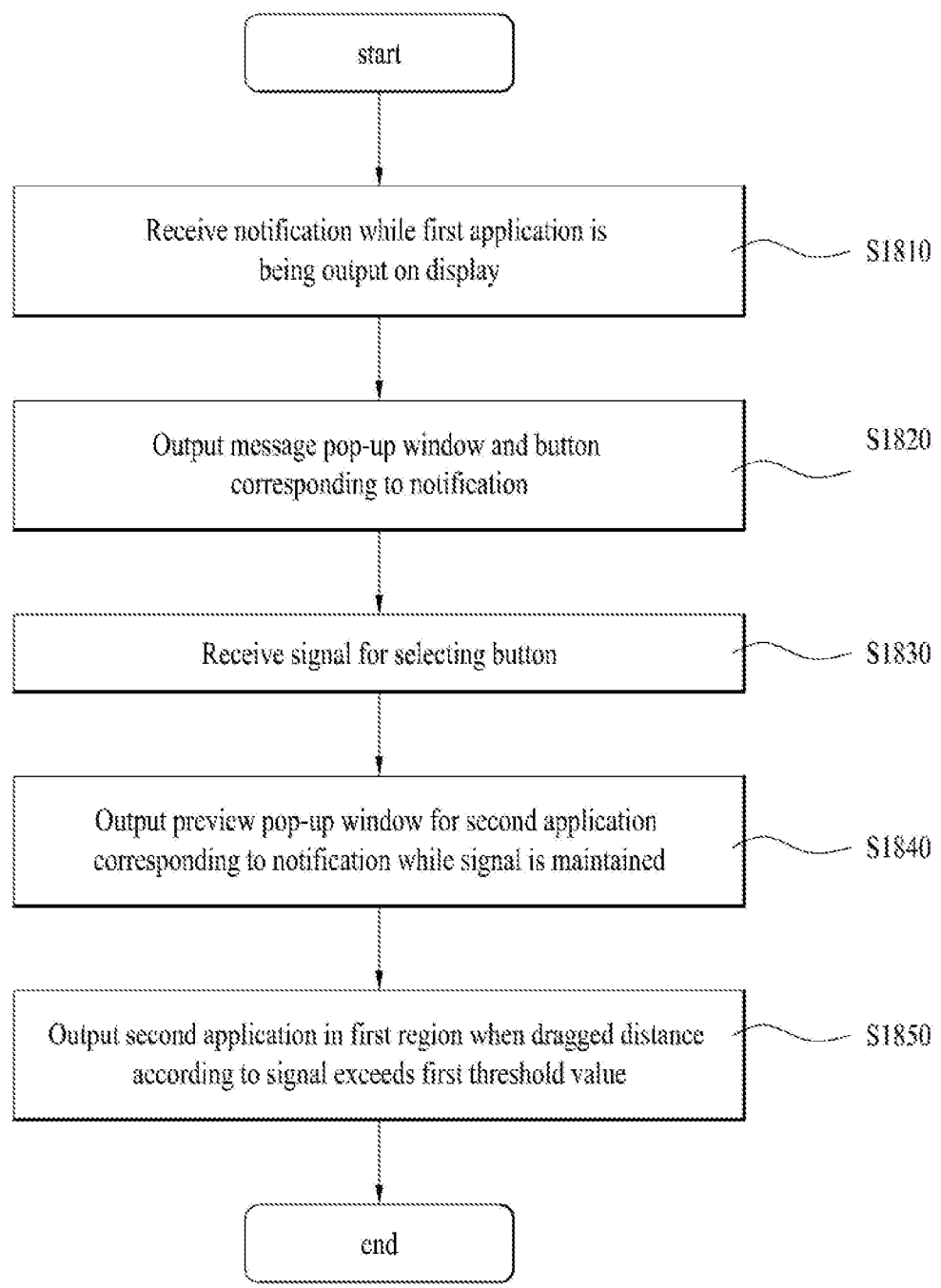

MOBILE TERMINAL AND CONTROL METHOD THEREFOR

CROSS-REFERENCE TO RELATED APPLICATION(S)

Pursuant to 35 U.S.C. § 119 (a), this application claims the benefit of an earlier filing date and right of priority to International Application No. PCT/KR2020/011032, filed on Aug. 19, 2020, the contents of which are hereby incorporated by reference herein in its entirety.

BACKGROUND

Field

The present disclosure relates to a mobile terminal and a control method therefor and, more particularly, to a mobile terminal for outputting an application corresponding to a notification, and a control method therefor.

Discussion of the Related Art

Terminals may be classified into mobile/portable terminals or stationary terminals according to mobility thereof. Mobile terminals may also be classified into handheld terminals or vehicle mounted terminals according to whether or not a user can directly carry the terminal.

Functions of mobile terminals are diversifying. For example, the functions include data and voice communication, photography and video capture using a camera, voice recording, music file playback through a speaker system, and image or video output on a display. Some terminals additionally have an electronic gaming function or perform multimedia player functions. Particularly, recent mobile terminals may receive multicast signals that provide visual content such as broadcast, video, or television programs.

As functions of such terminals are diversified, the terminals are implemented in the form of a multimedia player equipped with composite functions such as photograph or video capture, music or video file playback, and broadcast reception.

To support and increase the functions of the terminals, improvement of a structural part and/or software part of the terminals may be considered.

Recently, a flexible display having sufficient elasticity and capable of large deformation has been developed. The size of the display of a mobile terminal may be varied using the deformable nature of the flexible display.

However, if a notification is received when an extended display is used, there have been issues of stopping a current task in order to check the received notification and returning back to a previous task after checking the received notification. Thereby, a user should perform repeated and cumbersome processes.

SUMMARY

An object of the present disclosure is to solve the above and other problems.

An object of the present disclosure is to provide a mobile terminal for outputting an application corresponding to a notification, and a control method therefor, when the mobile terminal includes a display coupled to a body to vary a display region viewed from a front face of the body according to switching between an enlarged display mode and a reduced display mode.

To achieve these objects and other advantages and in accordance with the purpose of the disclosure, as embodied and broadly described herein, a mobile terminal includes a body, a communication unit configured to externally transmit and receive a signal, an input unit configured to receive user input, a display coupled to the body to vary a display region viewed from a front face of the body according to switching between an enlarged display mode and a reduced display mode, and a controller. The controller outputs a message pop-up window and a button corresponding to a notification upon receiving the notification while a first application is being output on the display, receives a first signal for selecting the button, outputs a preview pop-up window for a second application corresponding to the notification while the first signal is maintained, and outputs the second application in a first region when a dragged distance according to the first signal exceeds a first threshold value.

According to an aspect of the present disclosure, the controller may reduce a size of a second region in which the first application has been output, when the first signal is released in a state in which the second application is output in the first region.

According to an aspect of the present disclosure, the controller may end output of the second application output in the first region based on a second signal for selecting the button.

According to an aspect of the present disclosure, the preview pop-up window may be output in a preset region in a first direction and the first direction may be opposite to a dragged direction of the first signal.

According to an aspect of the present disclosure, the controller may receive a third signal for selecting the button in a second direction in a state in which the second application is output in the first region, split the first region based on the third signal, and output the second application and a third application in the split first region, the first region being split based on the second direction.

According to an aspect of the present disclosure, the controller may receive a fourth signal for re-selecting the button in a state in which the second application is output in the first region, select the second application based on the fourth signal, and end output of the second application when the fourth signal is dragged in a third direction.

According to an aspect of the present disclosure, a dragged distance according to the fourth signal may exceed the first threshold value.

According to an aspect of the present disclosure, the first application may be being output in the enlarged display mode.

According to an aspect of the present disclosure, the first application may be being output in the reduced display mode.

According to an aspect of the present disclosure, the controller may switch the display to the enlarged display mode upon outputting the second application in the preview pop-up window based on the first signal.

According to an aspect of the present disclosure, the controller may switch the display to the enlarged display mode upon outputting the second application in the first region based on the first signal.

According to an aspect of the present disclosure, the controller may switch the display to the reduced display mode and end output of the second application, when the first signal is dragged in a fourth direction in a state in which the first signal is not released, after the display is switched to the enlarged display mode based on the first signal.

According to an aspect of the present disclosure, wherein the controller may receive a fifth signal for re-selecting the button after the display is switched to the enlarged display mode based on the first signal, select the second application based on the fifth signal, and switch the display to the reduced display mode and ends output of the second application, when the fifth signal is dragged in the fourth direction.

According to an aspect of the present disclosure, the first region may be a display region viewed from a rear face of the body.

According to an aspect of the present disclosure, the first region may be a lower region of the display viewed from the front face of the body.

According to an aspect of the present disclosure, the controller may output a preview pop-up window for the enlarged display mode to output the first application and the second application, when the dragged distance according to the first signal exceeds a second threshold value, and switch the display to the enlarged display mode and output the first application and the second application on the display, when the first signal is released.

According to an aspect of the present disclosure, the controller may output a first preview pop-up window and a second preview pop-up window for the first application and the second application based on the first signal, when the mobile terminal operates in a landscape mode, select one of the first preview pop-up window and the second preview pop-up window based on a direction of a sixth signal for selecting the button, and output the first application and the second application on the display based on the selected preview pop-up window.

According to an aspect of the present disclosure, a position at which the button is output may be determined based on a region of a user touch signal input on the display for a preset time period.

According to an aspect of the present disclosure, the controller may end output of the button when a preset time elapses after receiving the notification.

According to an aspect of the present disclosure, provided herein is a method of controlling a mobile terminal including a display coupled to a body to vary a display region viewed from a front face of the body according to switching between an enlarged display mode and a reduced display mode. The method includes receiving a notification while a first application is being output on the display, outputting a message pop-up window and a button corresponding to the notification, outputting a preview pop-up window for a second application corresponding to the notification based on a signal for selecting the button, and outputting the second application in a first region when a dragged distance according to the signal exceeds a first threshold value.

Further scopes of applicability of the present disclosure will become apparent from the following detailed description.

However, those skilled in the art may understand that various modifications and changes may be possible within the concept and scope of the present disclosure and the detailed description and specific examples, such as exemplary embodiments of the disclosure, will be given by way of illustration only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a side view of the mobile terminal as viewed from a third direction;

FIG. 7 is a view showing a driving unit of the mobile terminal in accordance with an embodiment;

FIG. 8 is a cross-sectional view taken along lines A-A and B-B in FIG. 2;

FIGS. 11A to 11C are diagrams illustrating embodiments of outputting a preview pop-up window for an application corresponding to a notification and outputting and ending the application in a mobile terminal according to an embodiment of the present disclosure;

FIG. 18 is a flowchart illustrating an embodiment of outputting a preview pop-up window for an application corresponding to a notification in a mobile terminal according to an embodiment of the present disclosure.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
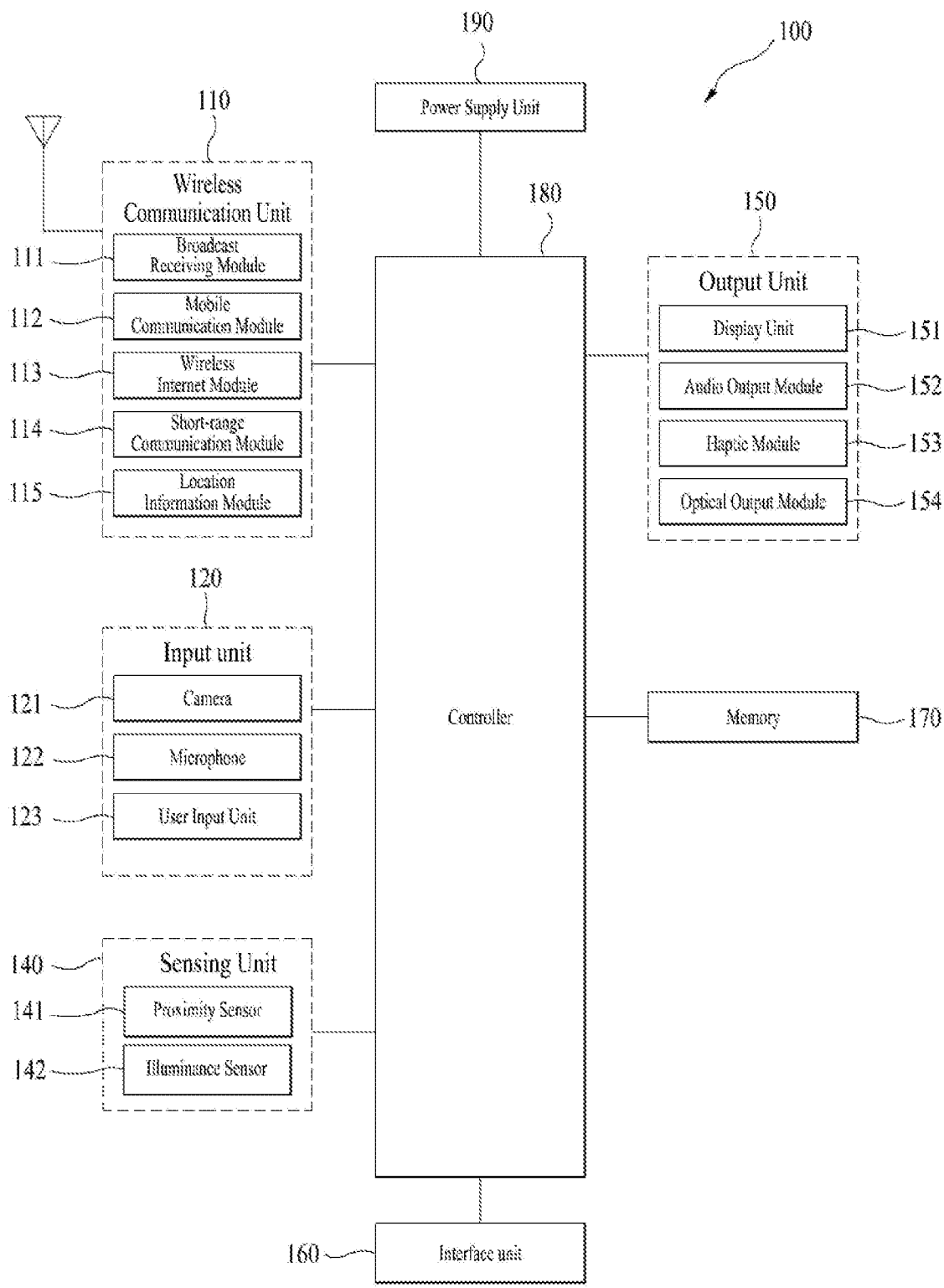
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
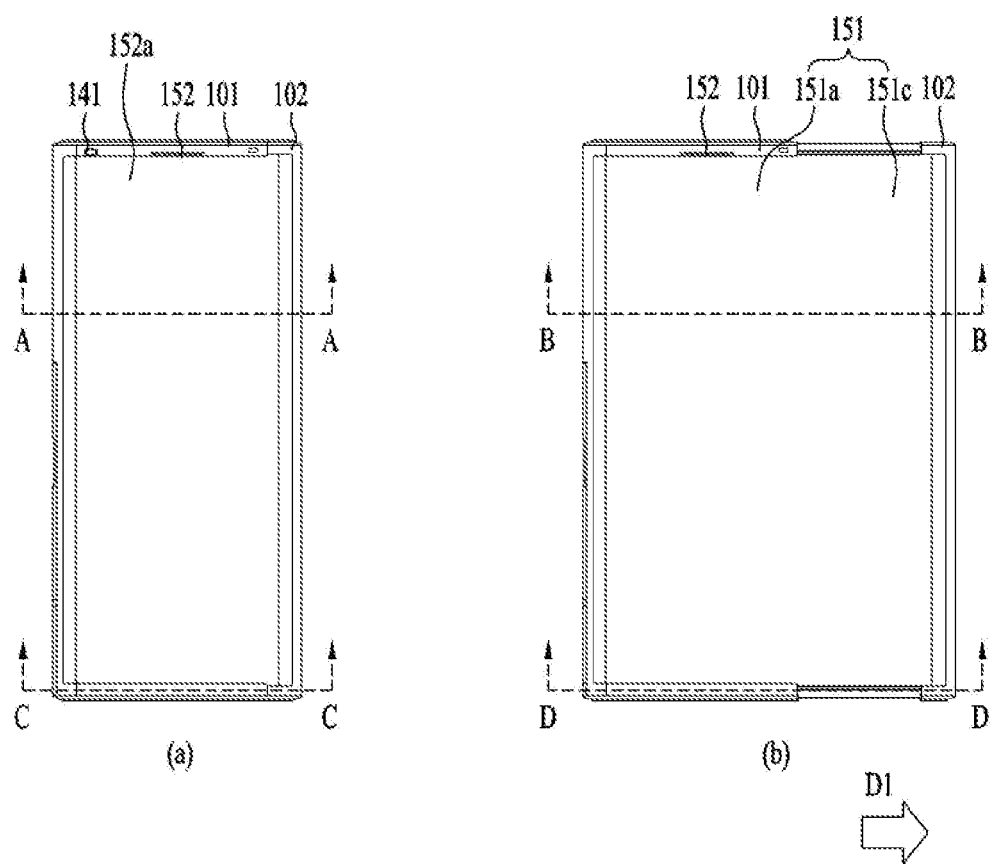
FIG. 2 is a front view of a first state and a second state of the mobile terminal in accordance with an embodiment.
Figure 3:
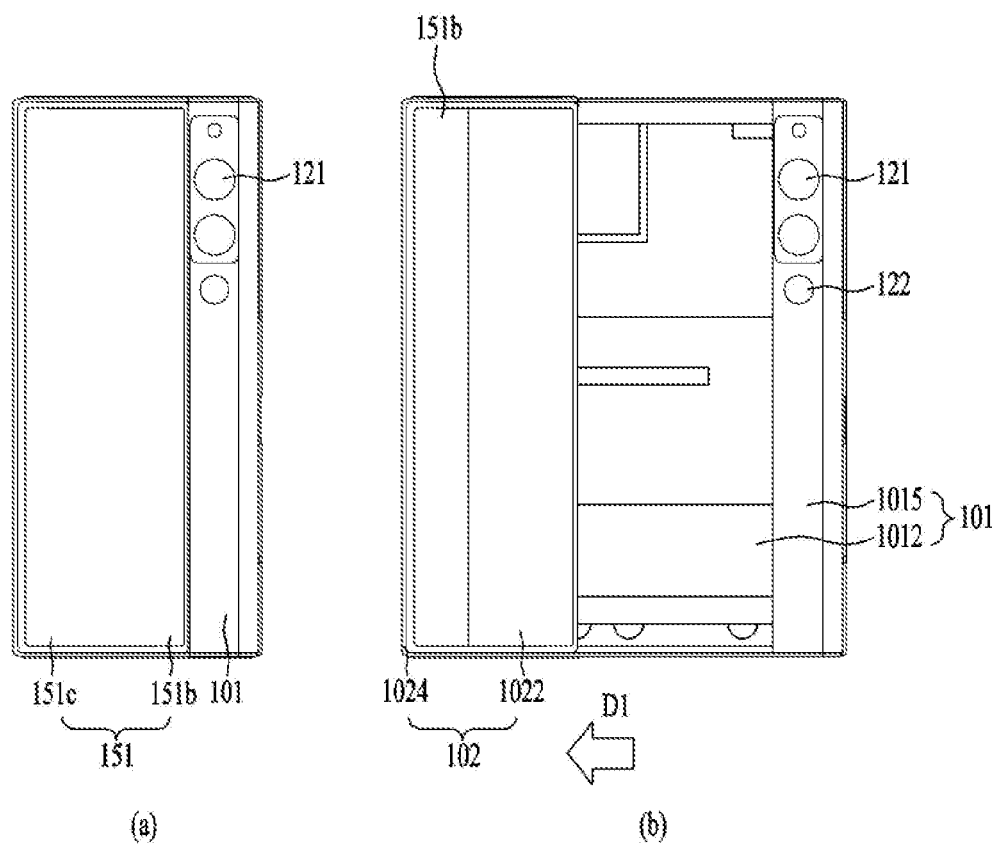
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and region on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the region thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the region of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, a region of rear face of the display unit 151 decreases as a region of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the region of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
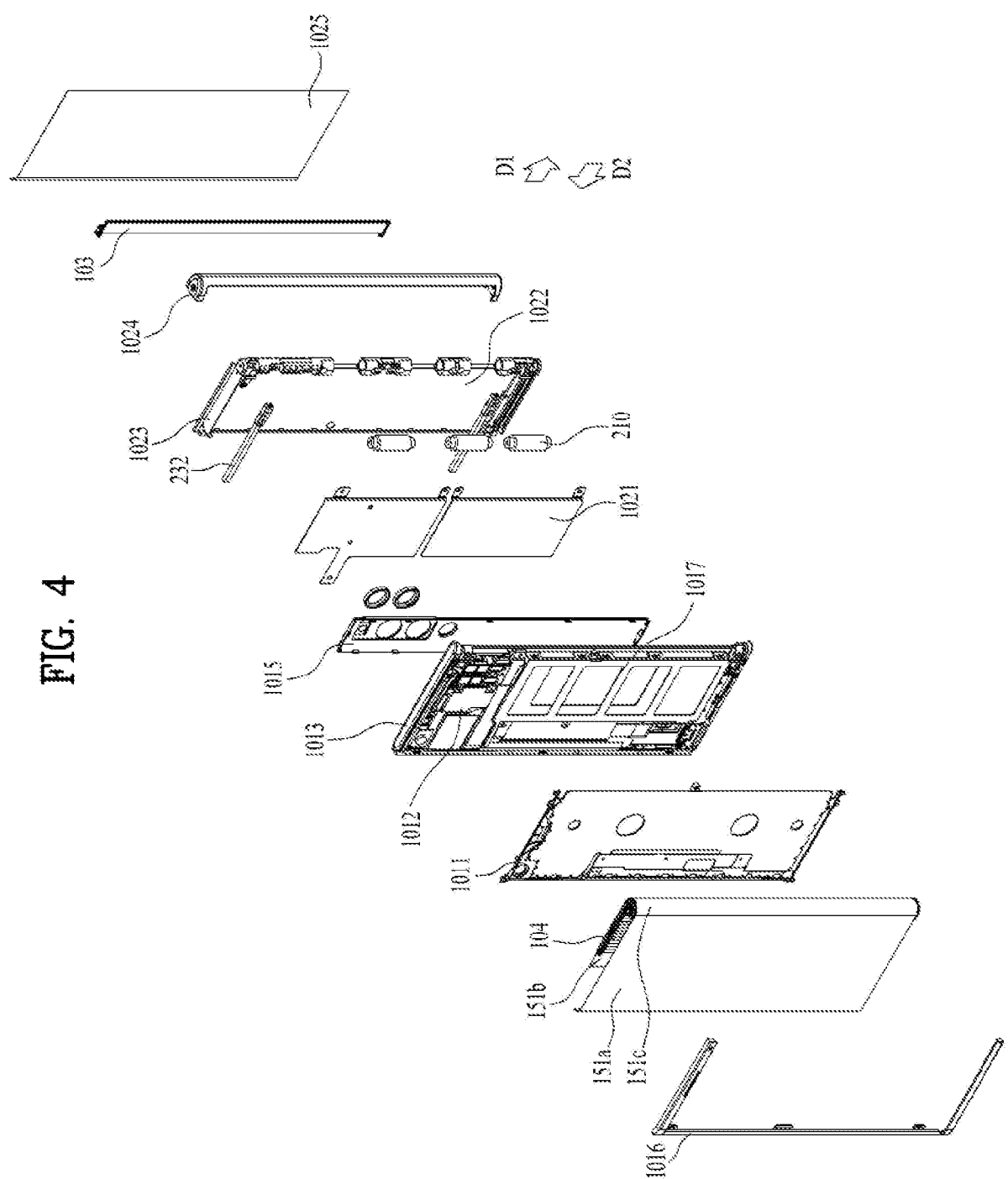
FIGS. 4 and 5 are exploded perspective views of the mobile terminal in accordance with an embodiment.
Figure 5:
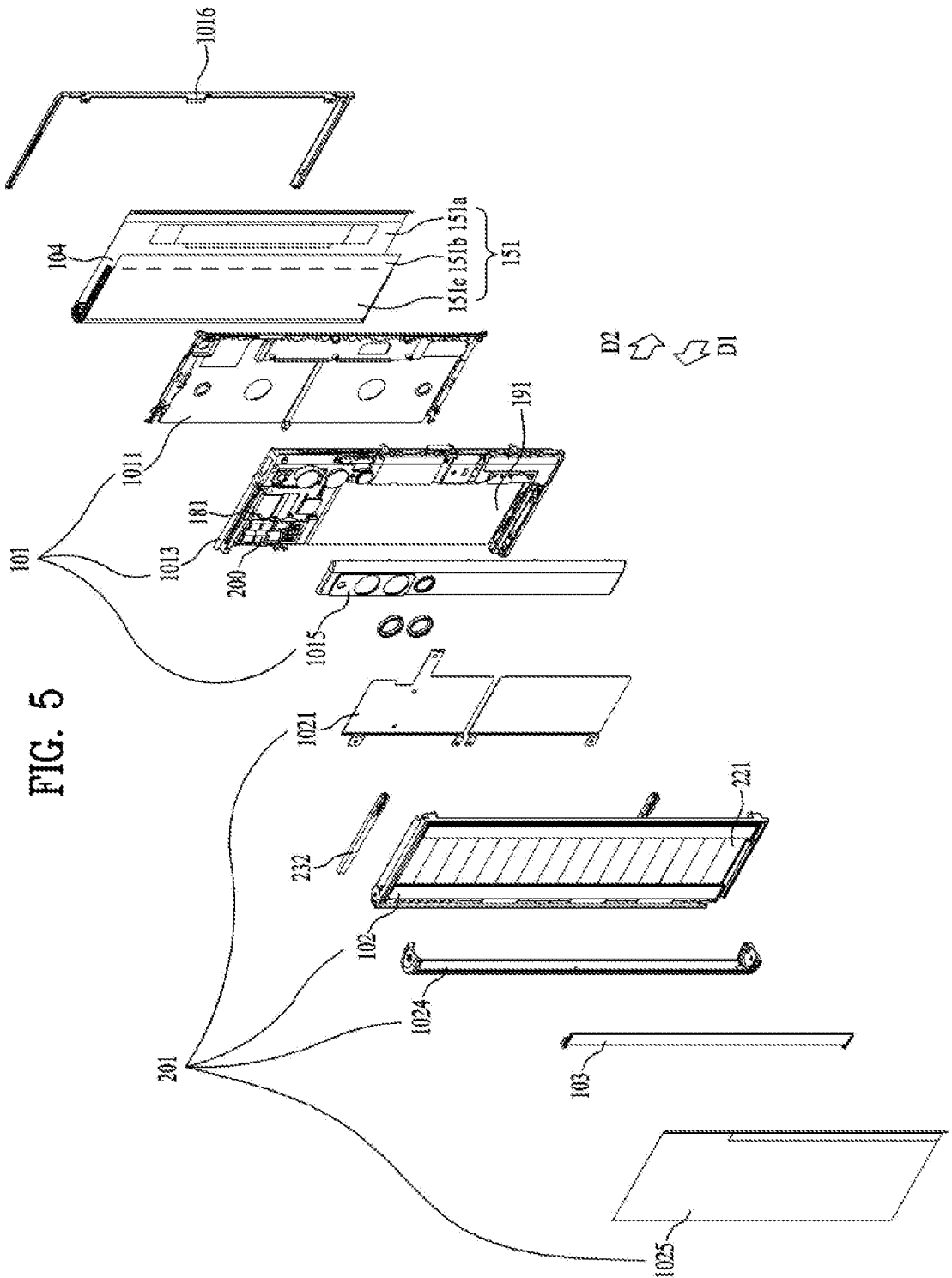

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and 151b and a variable portion 151c. The fixed portion 151a and 151b means a portion fixed to the frame. Because of being fixed to the frame, the fixed portion 151a and 151b maintains a constant shape without changing a bending degree. On the other hand, the variable portion 151c means a portion in which a bending angle or a position of the bent portion changes. The variable portion 151c in which the position or bending angle of the bent portion changes requires a structure for supporting a rear face of the variable portion 151c in response to the change.

The fixed portion 151a, 151b is coupled to the first frame of the display unit and is always positioned on the front face of the display unit to form a portion of the front face of the display unit. The variable portion 151c includes a side face located at a side portion of the mobile terminal, and a position of the side face varies depending on the position of the second frame. Based on a side face, a region of a portion disposed on the front face of the display unit and a region of a portion disposed on the rear face of the display unit vary. That is, a portion of the variable portion 151c may be the front face and another portion of the variable portion 151c may be the rear face based on the first and second states. The variable portion 151c is positioned in the first direction with respect to the fixed portion 151a, 151b relative to the mobile terminal, and an end of the variable portion 151c is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(a), and may be exposed rearward in the second state as shown in FIG. 3(b).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

FIG. 6 is a side view of the mobile terminal as viewed from a third direction. FIG. 6 illustrates the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151*a* disposed on the front of the mobile terminal 100, a second region 151b coupled to a slide frame 103 positioned on the rear of the mobile terminal 100, and a third region 151c located between the first region 151a and the second region 151b and bent around the roller 210. The third region 151c may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the roller 210. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

FIG. 7 is a view showing a driving unit 200 of the mobile terminal 100 in accordance with an embodiment. FIG. 7(a) illustrates the first state and FIG. 7(b) illustrates the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(b), when switch to the second state occurs, the rolling plate 104 may move to the front and the rolling plate 104 may be positioned on the front portion of the second frame 102.

The third region 151c of the display unit 151 in which the rolling plate 104 is positioned is a portion where bending deformation occurs when switch from the first state to the second state occurs. Accordingly, the rolling plate 104 may be deformed according to deformation of the third region 151c. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
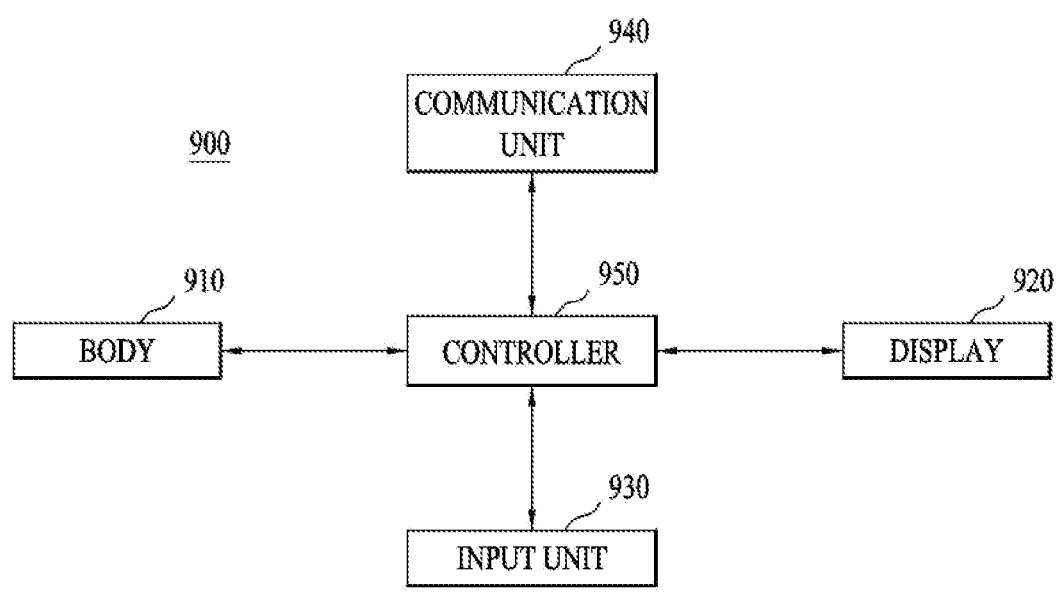
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, a communication unit 940, and a controller 950.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

The mobile terminal 900 may further include a driving unit (not illustrated) for causing the second frame to be extended or contracted. Here, the driving unit may be implemented as the driving unit 200 of FIG. 7.

The mobile terminal 900 may operate in an enlarged display mode as the second frame is extended, and may operate in a reduced display mode as the second frame is contracted. The enlarged display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

As the second frame is contracted, the display portion positioned on the front of the body 910 may move to the side of the body 910 or to the rear of the body 910 via the side of the body 910.

In an embodiment of the present disclosure, a state in which the second frame is not extended, i.e., a state in which the mobile terminal 900 is in the reduced display mode, may be defined as a default state. In addition, a state in which the mobile terminal is in the reduced display mode may be referred to as a first mode and a state in which the mobile terminal is in the enlarged display mode may be referred to as a second mode.

The display 920 may display visual information. The visual information may include text, indicators, icons, content, applications, images, and videos. The display 920 may output visual information on a screen based on a control command of the controller 950.

The display 920 may split a region in an enlarged display mode. More specifically, the display may output different pieces of information in split regions. For example, the display 920 may output a first application in a first region, a second application in a second region, and a third application in a third region.

The display 920 may output a visual effect. More specifically, the display 920 may assign an effect to output visual information rather than simply outputting visual information. For example, the display 920 may perform black and white processing, blur processing, or dimming process upon output applications. The display 920 may output the visual effect only in a partial region.

In an embodiment of the present disclosure, the display 920 may output a message pop-up window or an application corresponding to a notification received through the communication unit 940 according to control of the controller 950.

Although the display 920 may have an inter-layered structure or an integrated structure with a touch sensor as illustrated with reference to FIG. 1, so that the display 920 may be implemented with a touch screen, an output function and a touch function may be individually controlled. This will be described hereinbelow with reference to the drawings.

The input unit 930 may receive a variety of user input for the mobile terminal 900 and delivers an input result to the controller 950 so that the controller 950 may perform an operation based on user input. For example, the input unit 930 may receive an input signal of touching a first region from the user and deliver an input result to the controller 950 so that the controller 950 may determine that the user has selected the first region.

In an embodiment of the present disclosure, the input unit 930 may be provided on the display 920 and may be implemented as a touch screen. Although the input unit 930 may be included in the display 920, a touch function may be controlled separately from an output function of the display 920. The input unit 930 may be implemented as the input unit 120 of FIG. 1.

The input unit 930 may detect touch input from the user. In this case, the input unit 930 may also detect a point at which the touch input is sensed, a touched area, and touched pressure.

The input unit 930 may receive an input signal of simply touching an icon or an image from the user and receive a touch and drag input signal of touching an icon or an image and then dragging the icon or the image to another position. The input unit 930 may also receive a touch and drag input signal of touching and then dragging a button and the controller 950 may acquire a dragged distance and a dragged direction of the received touch and drag input signal.

The communication unit 940 may externally perform communication. The communication unit 940 may transmit and receive information (data) to or from an external device through various communication techniques. In an embodiment of the present disclosure, the communication unit 940 may receive an event or a notification generated from an external server or an external device.

For example, the communication unit 940 may receive a telephone call or a text message. Similarly, the communication unit 940 may transmit the event to the external server or the external device. The communication unit 940 may be implemented by the wireless communication unit 110 of FIG. 1.

The controller 950 may process data, control the units of the mobile terminal 900 described above, and control data transmission/reception between the units. In the present disclosure, the controller 950 may be implemented as the controller 180 of FIG. 1.

Operations performed by the mobile terminal 900 may be controlled by the controller 950. However, in the drawings and the following description, these operations will be collectively described, for convenience, as being performed/controlled by the mobile terminal 900.

Hereinafter, embodiments of the present disclosure will be described with reference to FIGS. 10A to 18. In describing and understanding the embodiments of the present disclosure, reference may be made to the above description given with reference to FIGS. 1 to 9.

FIGS. 10A to 10E are diagrams illustrating buttons according to an embodiment of the present disclosure.

Figure 10A:
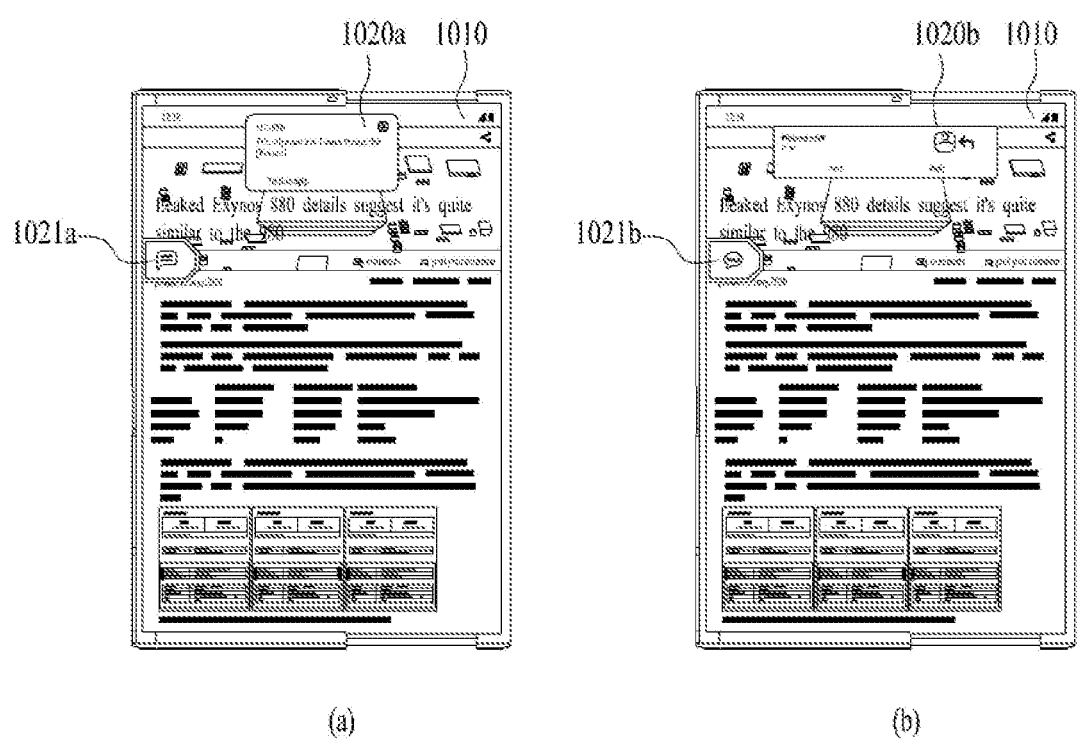
FIGS. 10A to 10E are diagrams illustrating buttons according to an embodiment of the present disclosure.

FIG. 10A is a diagram illustrating an embodiment of outputting a button corresponding to a notification in a mobile terminal according to an embodiment of the present disclosure.

In an embodiment of the present disclosure, upon receiving a notification in a state in which a first application 1010 is being output on the display, the mobile terminal may output a message pop-up window corresponding to the notification.

The mobile terminal may also output a button corresponding to the notification.

Referring to FIG. 10A(a), the mobile terminal may receive a first notification while the first application 1010 is being executed in a background state on the display. For example, the first notification may be a text message. The mobile terminal may output a first message pop-up window 1020a corresponding to the first notification. In this case, the first message pop-up window 1020a may be output in a preset region of the display.

In an embodiment of the present disclosure, the mobile terminal may output a first button 1021a corresponding to the first notification. In this case, the first button 1021a may be a button indicating a second application corresponding to the first notification. For example, when the first notification corresponds to the text message, the second application may be a text application. Thereby, the mobile terminal may output an icon indicating the text application through the first button 1021a.

Similarly, referring to FIG. 10A(b), the mobile terminal may receive a second notification while the first application 1010 is being executed in the background state on the display. For example, the second notification may correspond to an instant message. The mobile terminal may output a second message pop-up window 1020b corresponding to the second notification.

In an embodiment of the present disclosure, the mobile terminal may output a second button 1021b corresponding to the second notification. The second button 1021b may be a button indicating a third application corresponding to the second notification. For example, when the second notification corresponds to a messenger message, the third application may be a messenger application. Thereby, the mobile terminal may output an icon indicating the messenger application through the second button 1021b.

Figure 10B:
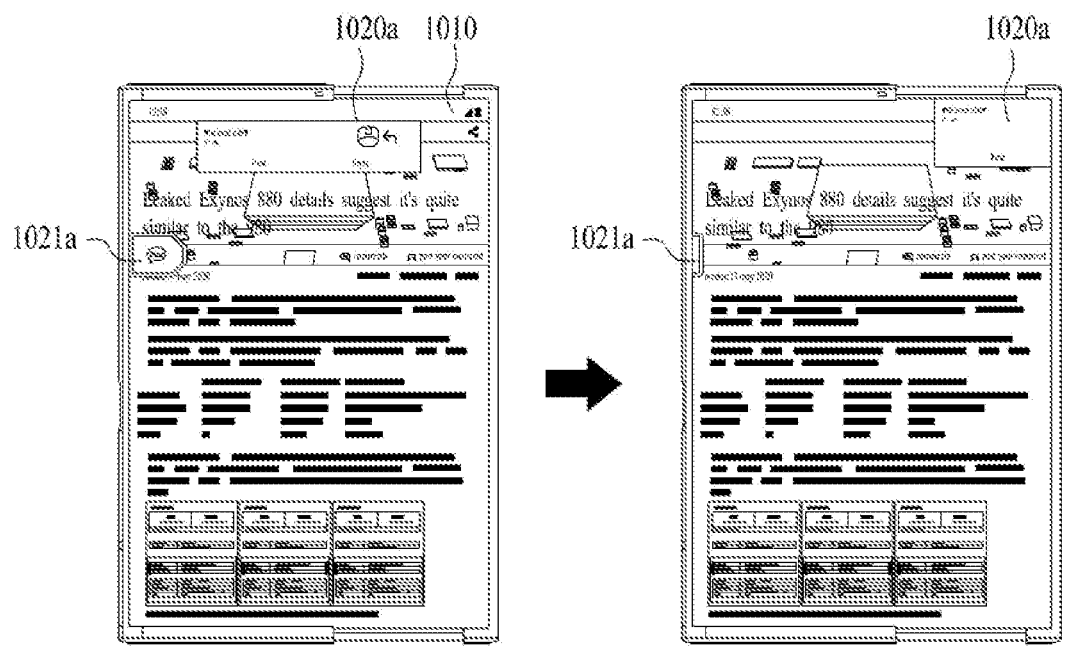

FIG. 10B is a diagram illustrating an embodiment of ending output of a button corresponding to a notification in a mobile terminal according to an embodiment of the present disclosure.

The left drawing of FIG. 10B may correspond to the drawing FIG. 10A(a) or FIG. 10A(b).

Referring to the left drawing of FIG. 10B, the mobile terminal may output the message pop-up window 1020a and the first button 1021a corresponding to the first notification while the first application 1010 is being output.

In an embodiment of the present disclosure, when no signal is input to at least one of the message pop-up window 1020a and the first button 1021a corresponding to the first notification for a preset time, the mobile terminal may end output of at least one of the message pop-up window 1020a and the first button 1021a. That is, when the preset time elapses after receiving the notification, the mobile terminal may end output of at least one of the message pop-up window 1020a and the first button 1021a.

For example, when no input signal is received for 3 seconds after the message pop-up window 1020a or the first button 1021a corresponding to the first notification is output, the mobile terminal may end output of the message pop-up window 1020a or the first button 1021a.

Figure 10C:
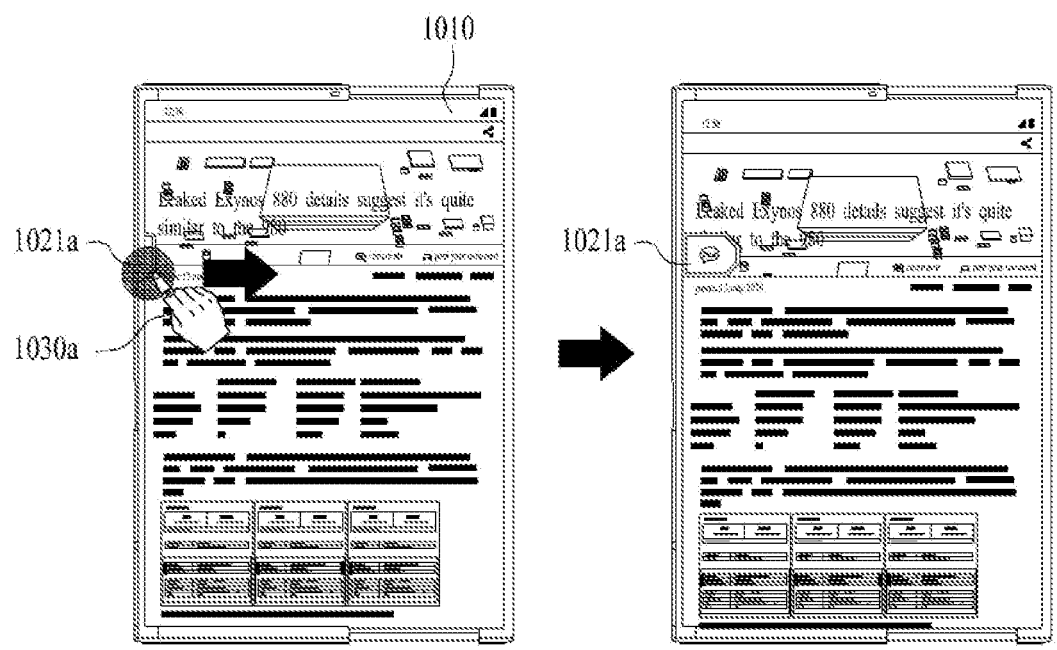

FIG. 10C is a diagram illustrating an embodiment of re-outputting a button corresponding to a notification in a mobile terminal according to an embodiment of the present disclosure.

The left drawing of FIG. 10C may correspond to the right drawing of FIG. 10B.

Referring to the left drawing of FIG. 10C, the mobile terminal may output the first button 1021a corresponding to the first notification in a hidden state while the first application 1010 is being output.

The hidden state may mean a state in which the first button 1021a is not fully output and, after output of the first button 1021a is ended, the first button 1021a of only a size of a degree capable of being recognized by a user is output.

In an embodiment of the present disclosure, the mobile terminal may receive a first signal 1030a for selecting the first button 1021a of the hidden state.

The first signal 1030a may be a user input signal of touching the first button 1021a of the hidden state or a user input signal of touching and then dragging the first button 1021a of the hidden state.

Referring to the right drawing of FIG. 10C, the mobile terminal may re-output the first button 1021a based on the first signal 1030a.

That is, the mobile terminal may output a button corresponding to a recently received notification in the hidden state and re-output the button according to necessity of the user.

Figure 10D:
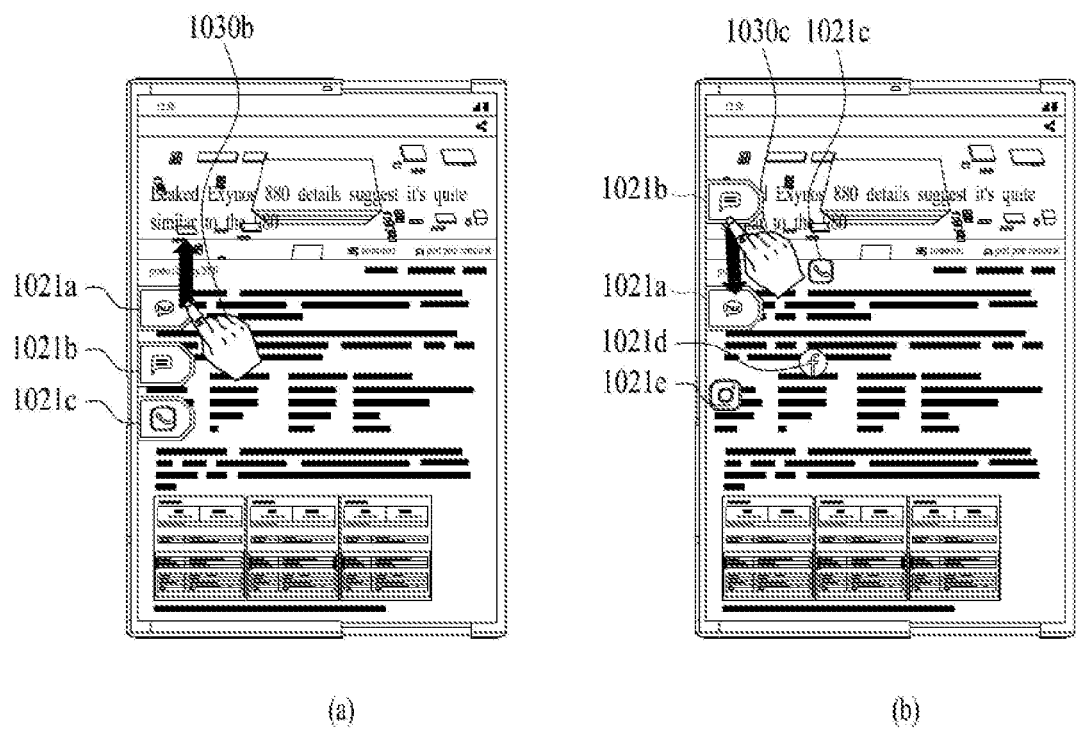

FIG. 10D is a diagram illustrating an embodiment of changing a button in a mobile terminal according to an embodiment of the present disclosure.

Referring to FIG. 10D(a), the mobile terminal may output the first button 1021a at a preset position while the first application is being output.

In an embodiment of the present disclosure, the mobile terminal may change the first button 1021a to a second button 1021b based on a second signal 1030b of dragging the first button 1021a in a first direction.

Similarly, in a state in which the second button 1021b is output, the mobile terminal may change the second button 1021b to a third button 1021c based on the second signal 1030b of dragging the second button 1021b in the first direction.

That is, upon receiving an input signal of dragging the first button 1021a in a preset direction in a state in which the first button 1021a corresponding to the first notification is output, the mobile terminal may change the first button 1021a to the second button 1021b corresponding to a second notification which has been received before the first notification.

Accordingly, if the user drags a button in a preset direction, the mobile terminal may change the button to a button corresponding to a notification which has been received in the past.

Referring to of FIG. 10D(b), the mobile terminal may output the first button 1021a at the preset position while the first application is being output. Unlike FIG. 10D(a), FIG. 10D(b) illustrates output of the second button 1021b, the third button 1021c, a fourth button 1021d, and a fifth button 1021e when the first button 1021a is touched in a preset manner. For example, if the user touches the first button 1021a with a preset pressure, the mobile terminal may output the second button 1021b to the fifth button 1021e.

The first button 1021a to the fifth button 1021e may correspond to applications which have been recently executed by the user. For example, the first button 1021a may correspond to a second application that the user has most recently used, the second button 1021b may correspond to a third application used before the second application, the third button 1021c may correspond to a fourth application used before the third application.

The first button 1021a to the fifth button 1021e may correspond to notifications that the user has recently received. For example, the first button 1021a may correspond to a first notification that the user has most recently received, the second button 1021b may correspond to a second notification received before the first notification, and the third button 1021c may correspond to a third notification received before the second notification.

In an embodiment of the present disclosure, the mobile terminal may change an output button based on a third signal 1030c for selecting any one of the second button 1021b to the fifth button 1021e which are output when the user touches the first button 1021a. That is, the mobile terminal may output the second button 1021b at a position of the first button 1021a according to the third signal 1030c for selecting the second button 1021b and end output of the remaining buttons.

That is, through the embodiment of FIG. 10D, the user may selectively output a button corresponding to a recently executed application or a recently received notification.

Figure 10E:
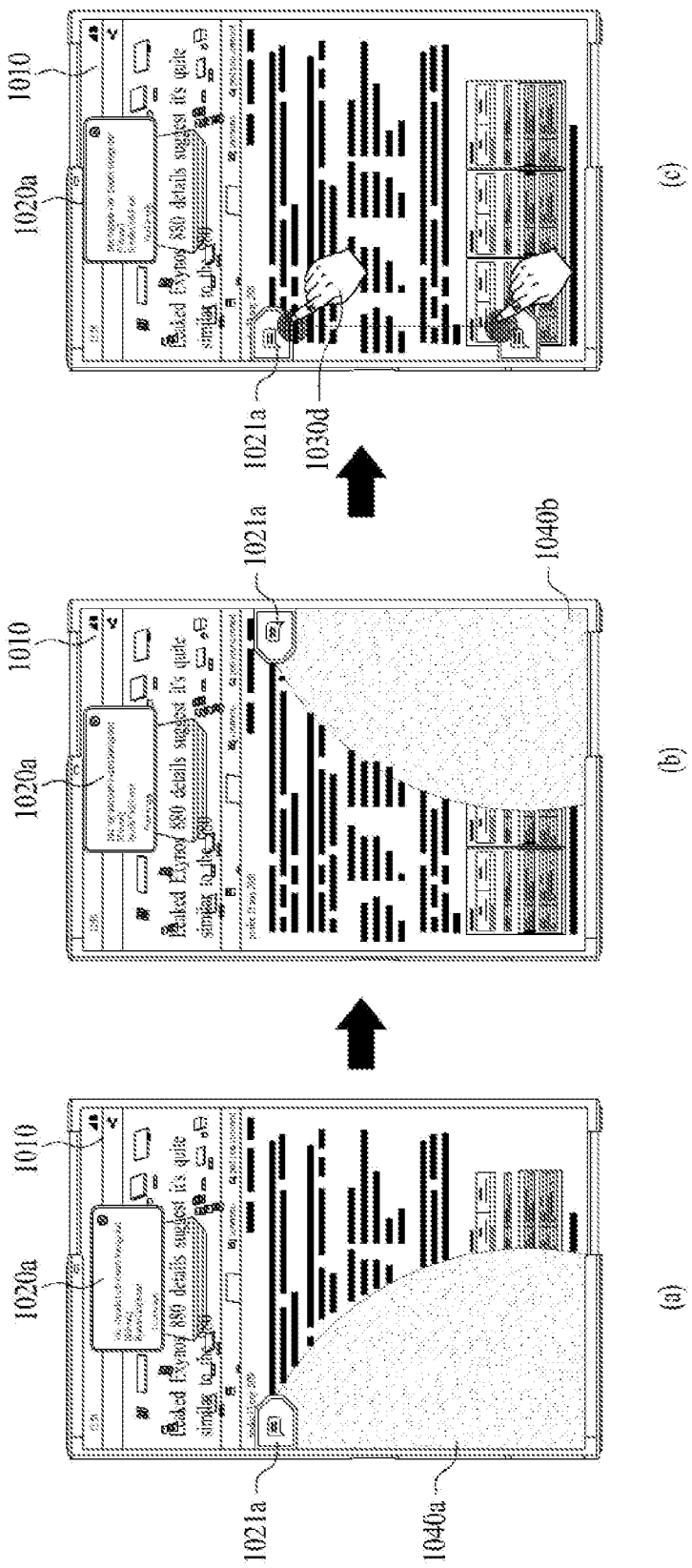

FIG. 10E is a diagram illustrating an embodiment of adjusting a position of an output button in a mobile terminal according to an embodiment of the present disclosure.

In an embodiment of the present disclosure, the mobile terminal may change a position of an output button based on a gripping region of the user.

Referring to of FIGS. 10E(a) to 10E(c), the mobile terminal may output the first button 1021a upon receiving the first notification while the first application 1010 is being output. A position at which the first button 1021a is output will now be described.

Referring to FIG. 10E(a), the mobile terminal may analyze a gripping region of the user for a preset time. In an embodiment of the present disclosure, the mobile terminal may determine a first region 1040a touched by the user for a first time. For example, the mobile terminal may analyze a region touched by the user for one hour after the display is switched to an activation state and determine the first region 1040a based on an analyzed result. Thereby, the mobile terminal may output the first button 1021a inside the first region 1040a.

Similarly, referring to FIG. 10E(b), the mobile terminal may determine a second region 1040b touched by the user for a preset time. Thereby, the mobile terminal may output the first button 1021a inside the second region 1040b.

Referring to FIG. 10E(c), the mobile terminal may receive a fourth signal 1030d for selecting and then dragging the output first button 1021a and releasing touch at a desired position. Thereby, the mobile terminal may change an output position of the first button 1021a from a point at which the fourth signal 1030d is touched to a point at which touch is released.

Figure 11A:
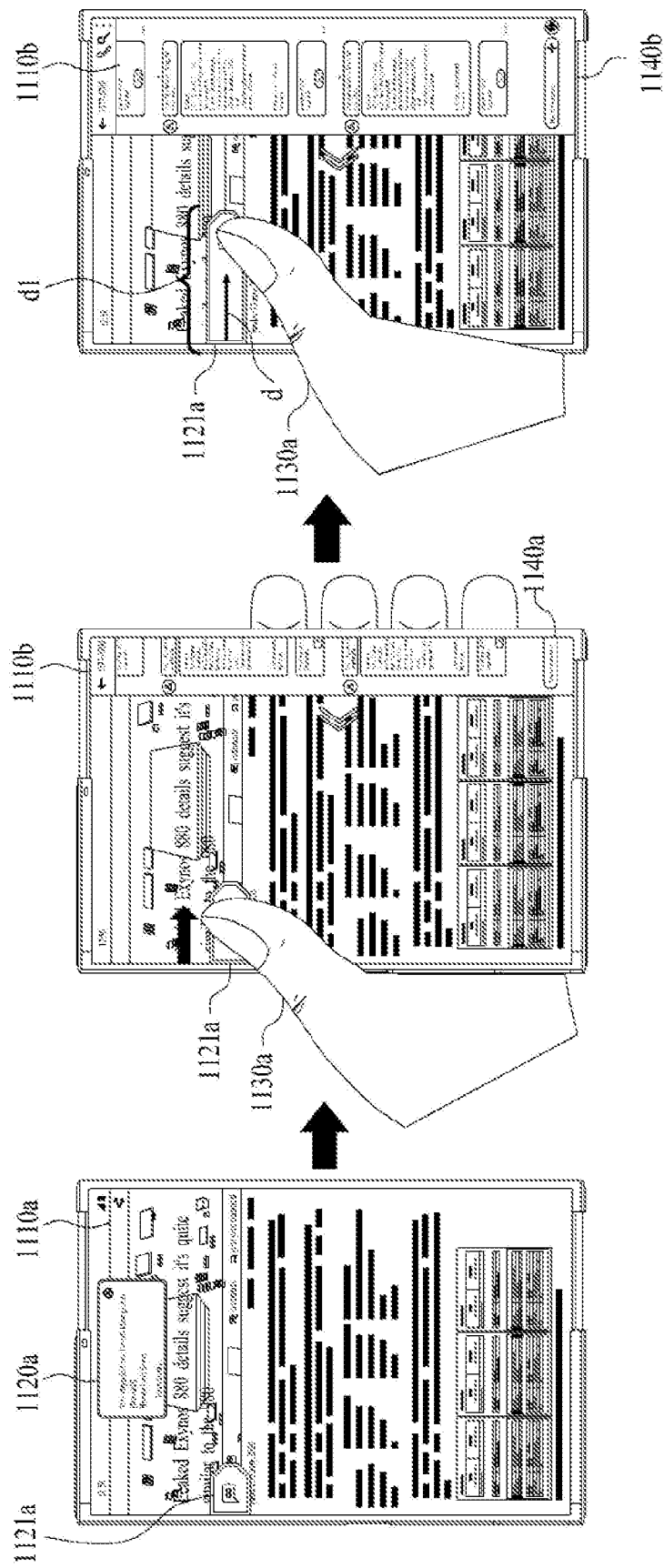
Figure 11C:
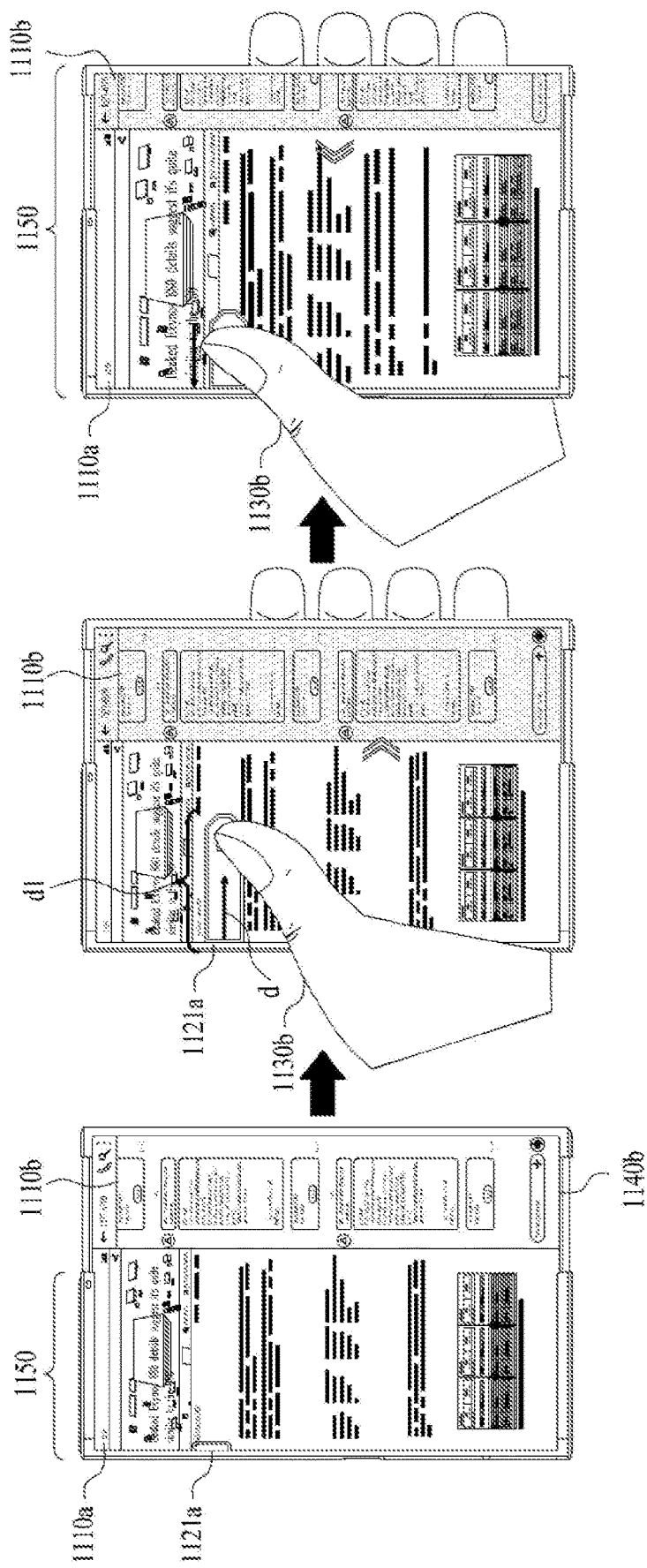
Figure 12:
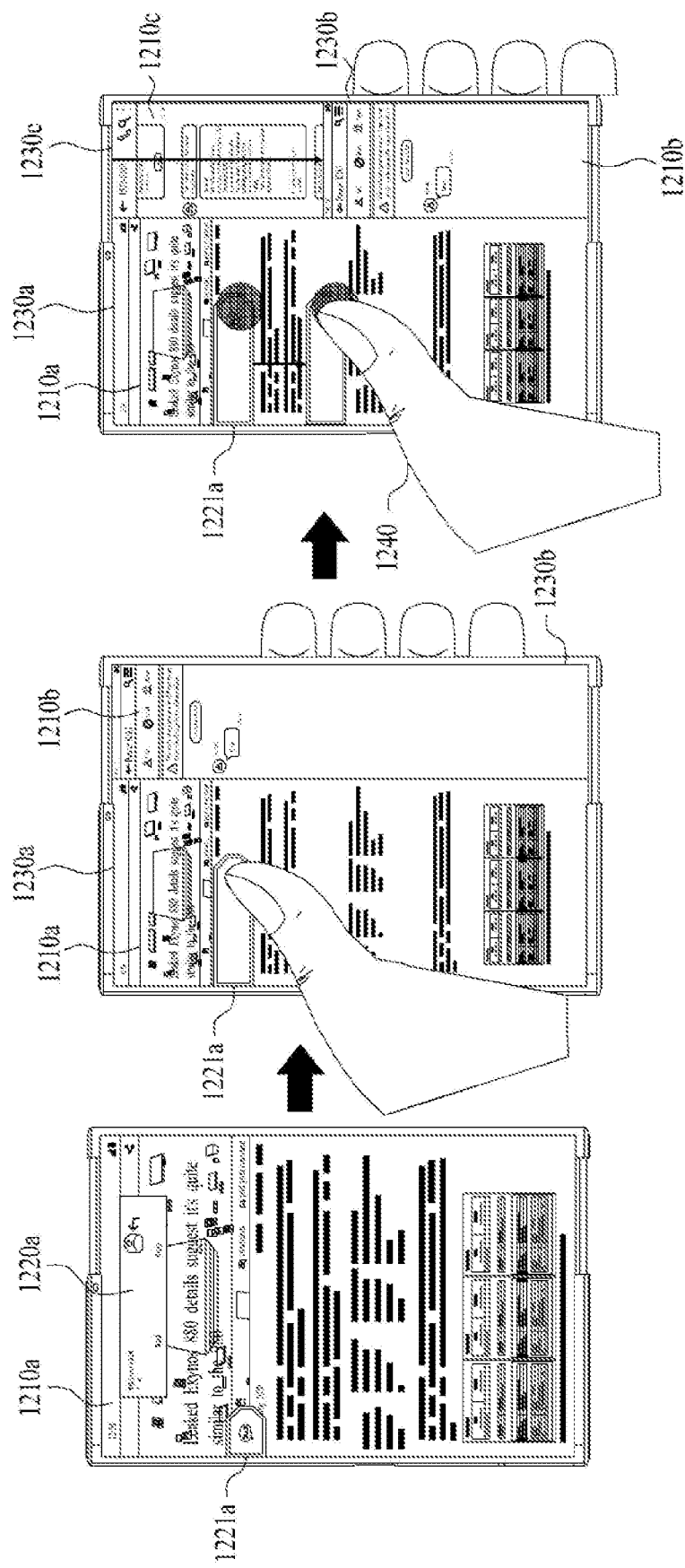
FIG. 12 is a diagram illustrating an embodiment of splitting a region based on a direction of a signal for selecting a button in a mobile terminal according to an embodiment of the present disclosure.

Hereinafter, FIGS. 11A to 12 illustrate embodiments in an enlarged display mode and FIGS. 13A to 17B illustrate embodiments in a reduced display mode. Hereinafter, in describing FIGS. 11A to 17B, the above description may be applied and different reference symbols may be applied to the same configuration.

FIG. 11A is a diagram illustrating an embodiment of outputting a preview pop-up window for an application corresponding to a notification and outputting the application in a mobile terminal according to an embodiment of the present disclosure.

Referring to the first drawing of FIG. 11A, upon receiving a notification while a first application 1110a is being output in the enlarged display mode, the mobile terminal may output a message pop-up window 1120a corresponding to the notification. In this case, the mobile terminal may output a button 1121a corresponding to the notification.

Referring to the second drawing of FIG. 11A, the mobile terminal may receive a first signal 1130a for selecting the button 1121a. The mobile terminal may output a preview pop-up window 1140a for a second application 1110b corresponding to the notification while the first signal 1130a is maintained.

In particular, when the first signal 1130a is a touch and drag signal of dragging the button 1121a in a first direction (e.g., from left to right), the mobile terminal may output the preview pop-up window 1140a in a second direction (e.g., from right to left) opposite to the first direction.

The mobile terminal may determine a size with which the preview pop-up window 1140a is output based on a dragged distance of the first signal 1130a. That is, the mobile terminal may output the preview pop-up window 1140a such that the preview pop-up window 1140a is withdrawn from the second direction in stages by the dragged distance after the button 1121a is selected.

Referring to the third drawing of FIG. 11A, when a dragged distance d according to the first signal 1130a exceeds a first threshold value d1, the mobile terminal may output the second application 1110b in a first region 1140b. A detailed description of this operation will now be contenuously given with reference to FIG. 11B.

FIG. 11B is a diagram illustrating an embodiment of outputting an application on a split screen in a mobile terminal according to an embodiment of the present disclosure.

The first drawing of FIG. 11B may correspond to the third drawing of FIG. 11A. That is, when the dragged distance d according to the first signal 1130a for selecting and then dragging the button 1121a exceeds the first threshold value d1, the mobile terminal may output the second application 1110b in a first region 1140b.

In this case, the mobile terminal may output the first application 1110a on a full screen in the enlarged display mode. That is, the mobile terminal may output the first application 1110a in a second region 1150 illustrated in the first drawing of FIG. 11B.

In an embodiment of the present disclosure, the mobile terminal may output the second application 1110b in the first region 1140b in an overlaid manner in a state in which the first application 1110a is output in the second region 1150. That is, the mobile terminal may output the second application 1110b in a manner of overlaying the second region 1150 in a state in which the first application 1110a is output in the second region 1150 while touch of the first signal 1130a is maintained.

Referring to the second drawing of FIG. 11B, when a dragged distance of touch of the first signal 1130a exceeds the first threshold value d1 and then touch is released, the mobile terminal may reduce the size of the second region 1150 in which the first application 1110a is output.

That is, unlike the first drawing of FIG. 11B, when the first signal 1130a is released, the mobile terminal outputs the second application 1110b in the first region 1140b not in an overlay manner but in a split manner of an output region.

Accordingly, when the first signal 1130a is released, the mobile terminal may output the first application 1110a in the reduced second region 1150 and output the second application 1110b in the first region 1140b, so that the mobile terminal may individually use the applications.

Although not shown in the drawing, when the second application 1110b is output in a split region, the mobile terminal may end output of the button 1121a. Hereinafter, an embodiment of ending output of the second application 1110b which is being output in the split region will be described.

FIG. 11C is a diagram illustrating an embodiment of ending output of an application in a mobile terminal according to an embodiment of the present disclosure.

The first drawing of FIG. 11C may correspond to the second drawing of FIG. 11B. The mobile terminal may output the first application 1110a in the reduced second region 1150 and output the second application 1110b in the first region 1140b. That is, the mobile terminal may output the first application 1110a and the second application 1110b by splitting a screen in the enlarged display mode. In this case, the mobile terminal may output the button 1121a in a hidden state.

Referring to the second drawing of FIG. 11C, the mobile terminal may receive a second signal 1130b for selecting the button 1121a of a hidden state. Particularly, if the second signal 1130b is dragged in a first direction and a dragged distance d of the second signal 1130b exceeds the first threshold value d1, the mobile terminal may select the second application 1110b. In this case, upon selecting the second application 1110b, the mobile terminal may distinguishably indicate the second application 1110b.

Referring to the third drawing of FIG. 11C, if the dragged distance d of the second signal 1130b exceeds the first threshold value d1 and then the second signal 1130b is dragged in a second direction, the mobile terminal may end output of the second application 1110b. In this case, the second direction may be a direction opposite to the first direction. The mobile terminal may end output of the second application 1110b and, at the same time, output the first application 1110a in the enlarged second region 1150. Upon ending output of the second application 1110b, the mobile terminal may naturally output the second application 1110b as if the second application 1110b proceeds in a direction (i.e., the first direction) opposite to the second direction.

In an embodiment of the present disclosure, the second signal 1130b may be characterized in that touch thereof is maintained in the embodiments from the second and third drawings of FIG. 11C. That is, in order to end output of the second application 1110b which is being output in the split region, the user may select the second application 1110b by touching the button 1121a and then dragging the button 1121a in the first direction to exceed the first threshold value d1. After the second application 1110b is selected, the user may drag the button 1121a in the second direction while continuously touching the button 1121a so that the mobile terminal may end output of the second application 1110b.

FIG. 12 is a diagram illustrating an embodiment of splitting a region based on a direction of a signal for selecting a button in a mobile terminal according to an embodiment of the present disclosure.

The first and second drawings of FIG. 12 may be described with reference to FIG. 11A. That is, the first drawing of FIG. 12 illustrates an embodiment in which the mobile terminal outputs a message input window 1220a and a button 1221a corresponding to a notification upon receiving the notification while a first application 1210a is being output.

The second drawing of FIG. 12 illustrates an embodiment in which the mobile terminal outputs a second application 1210b corresponding to the button 1221a in a split region upon receiving a signal of dragging the button 1221a to a first threshold value. That is, referring to the second drawing of FIG. 12, the mobile terminal may output the first application 1210a in a first region 1230a and output the second application 1210b in a second region 1230b. In this case, since only two applications are being displayed in a front region of an extended display of the mobile terminal, the first region 1230a and the second region 1230b may be two regions which are split left and right.

Referring to the third drawing of FIG. 12, the mobile terminal may receive a first signal 1240 of dragging the button 1221a in a first direction (e.g., from top to bottom) while the first application 1210a is being output in the first region 1230a.

The mobile terminal may reduce the second region 1230b in which the second application 1210b is output in the first direction based on the first signal 1240 and output a third application 1210c in a third region 1230c.

More specifically, the mobile terminal may split the second region 1230b based on the first signal 1240. In this case, the mobile terminal may generate the third region 1230c by splitting the second region 1230b based on the direction of the first signal 1240. For example, if the first signal 1240 is a signal of touching the button 1221a and then dragging the button 1221 from top to bottom, the mobile terminal may reduce the second region 1230b in a downward direction and generate the third region 1230c in an upward direction.

Although not shown in the drawing, if the first signal 1240 is a signal of touching the button 1221a and then dragging the button 1221*a* from bottom to top, the mobile terminal may reduce the second region 1230*b* in an upward direction and generate the third region 1230*c* in a downward direction.

In this case, the third application 1230*c* may be an application which has been executed before the second application 1210*b*. The third application 1230*c* may also be at least one related application of the first application 1210*a* and the second application 1210*b*.

The embodiments of FIGS. 13A to 17B are the same as those of FIGS. 11A to 12 described above but are performed in a reduced display mode.

Figure 13A:
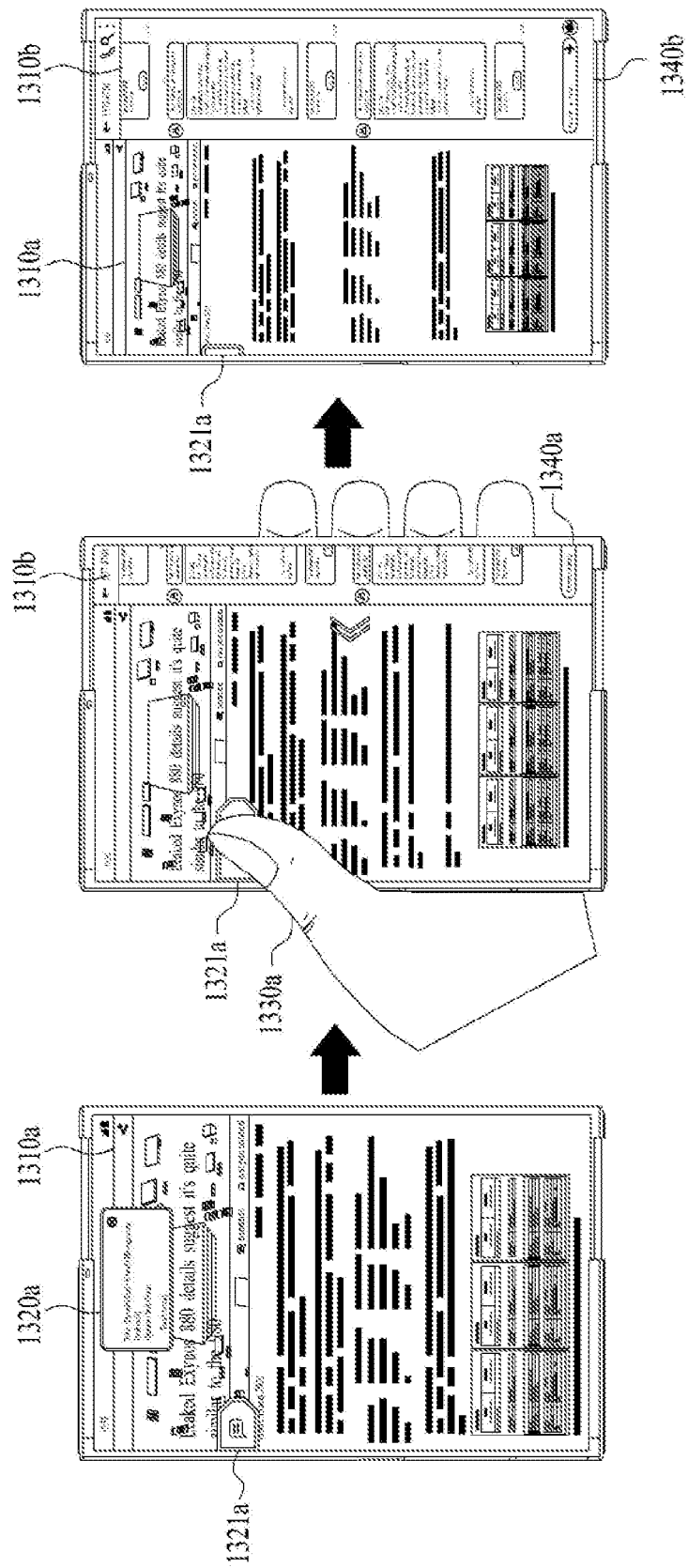
FIGS. 13A to 13C are diagrams illustrating embodiments of switching a display from a reduced display mode to an enlarged display mode through a button and outputting and ending an application in a mobile terminal according to an embodiment of the present disclosure.
Figure 13B:
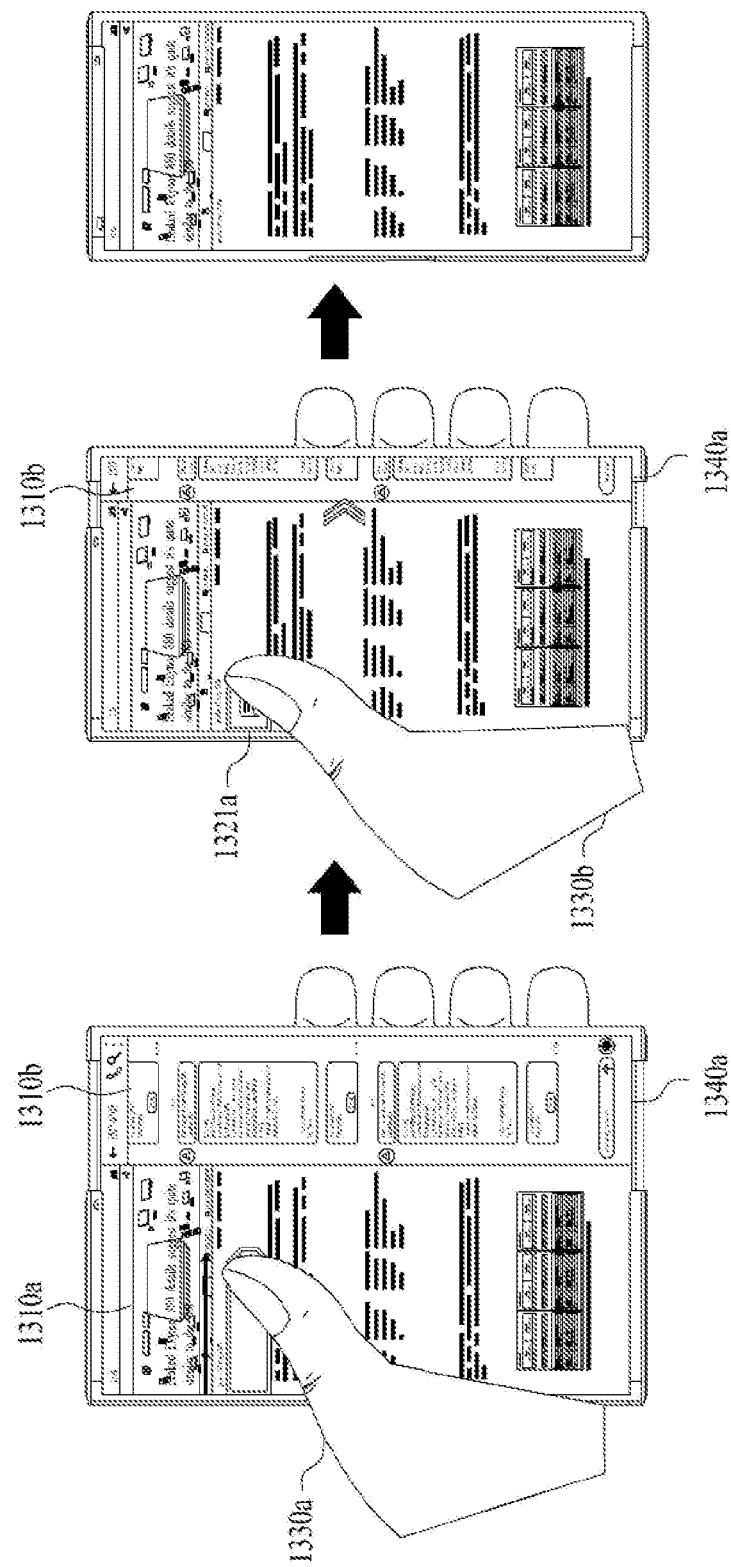
Figure 13C:
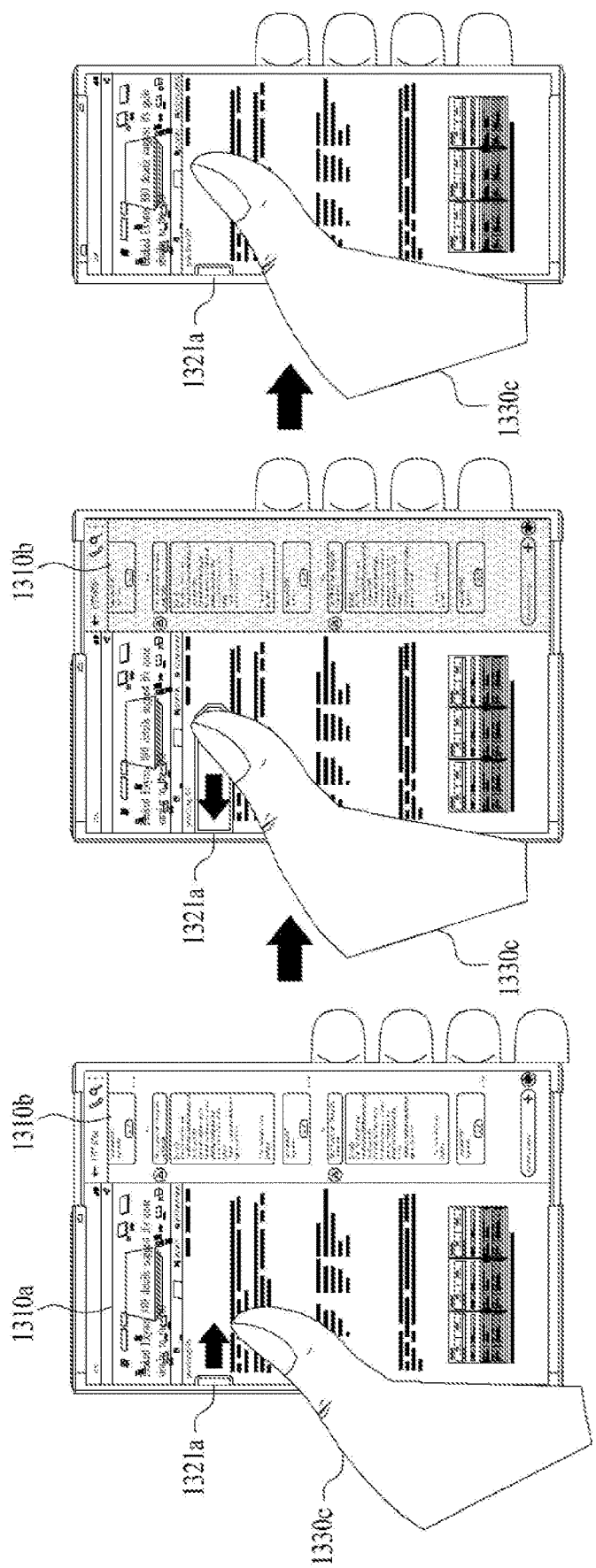

FIGS. 13A to 13C are diagrams illustrating embodiments of switching a display from a reduced display mode to an enlarged display mode through a button and outputting and ending an application in a mobile terminal according to an embodiment of the present disclosure.

FIG. 13A is a diagram illustrating an embodiment of switching a display from a reduced display mode to an enlarged display mode through a button and outputting an application in a mobile terminal according to an embodiment of the present disclosure. The embodiment of FIG. 11A may be applied to the embodiment of FIG. 13A.

However, referring to the first drawing of FIG. 13A, upon receiving a notification while a first application 1310*a* is being output in the reduced display mode, the mobile terminal may output a message pop-up window 1320*a* and a button 1321*a* corresponding to the notification.

Referring to the second drawing of FIG. 13A, the mobile terminal may receive a first signal 1330*a* for selecting the button 1321*a*. Upon outputting a second application 1310*b* corresponding to the notification in a preview pop-up window 1340*a* based on the first signal 1330*a*, the mobile terminal may switch the display to the enlarged display mode.

In an embodiment of the present disclosure, the mobile terminal may adjust the size of a first region 1340*b* in which the second application 1310*b* is output based on a dragged distance of the first signal 1330*a* of dragging the button 1321*a*. In this case, upon outputting the second application 1310*b* in the first region 1340*b* based on the first signal 1330*a*, the mobile terminal may gradually switch the display to the enlarged display mode and adjust the size of the first region 1340*b*.

Referring to the third drawing of FIG. 13A, if the first signal 1330*a* is dragged to a preset threshold value (e.g., d1) or more and then touch thereof is released, the mobile terminal may split a screen so that the mobile terminal may output the second application 1310*b* in the first region 1340*b* and the first application 1310*a* in a second region (not shown). Further, if touch of the first signal 1330*a* is released, the mobile terminal may switch the button 1321*a* to a hidden state.

FIG. 13B is a diagram illustrating an embodiment of ending an output application and switching a display back to a reduced display mode, after the dis[play is switched from the reduced display mode to an enlarged display mode through a button in a mobile terminal according to an embodiment of the present disclosure.

In an embodiment of the present disclosure, after the display is switched to the enlarged display mode based on the first signal 1330*a*, if the first signal 1330*a* is dragged in a second direction without being released, the display may be switched back to the reduced display mode and output of the second application may be ended. This will now be described in detail.

The first drawing of FIG. 13B may correspond to the second drawing of FIG. 13A.

That is, referring to the first drawing of FIG. 13B, the mobile terminal may output the second application 1310*b* in the preview pop-up window 1340*a* based on the first signal 1330*a*. In this case, upon outputting the second application 1310*b* in the preview pop-up window 1340*a* based on a dragged distance of the first signal 1330*a* in a first direction (e.g., from left to right), the mobile terminal may output the second application 1310*b* as if the second application 1310*b* appears from a second direction (e.g., from right to left) opposite to the first direction.

Referring to the second drawing of FIG. 13B, the mobile terminal may receive a second signal 1330*b* of dragging the button 1321*a* in the second direction while maintaining a touched state of the button 1321*a*. In this case, the first signal 1330*a* and the second signal 1330*b* may be continuous signals and correspond to a state in which the touched state of the button 1321*a* is maintained.

The mobile terminal may switch the display switched to the enlarged display mode back to the reduced display mode based on the second signal 1330*b* and end output of the preview pop-up window 1340*a* in which the second application 1310*b* is being output as if the preview pop-up window 1340*a* proceeds in the first direction.

In other words, the mobile terminal may reduce the size of the preview pop-up window 1340*a* in which the second application 1310*b* is being outputted based on a dragged direction of the button 1321*a* in a state in which touch of the button 1321*a* is maintained and, at the same time, switch the display to the enlarged display mode or the reduced display mode. In this case, the mobile terminal may determine a range in which the display is switched to the enlarged display mode or the reduced display mode based on dragged distances of the first signal 1330*a* and the second signal 1330*b*.

Referring to the third drawing of FIG. 13B, upon receiving a third signal (not shown) of dragging the button 1321*a* to an edge of the display, the mobile terminal may completely switch the display to the reduced display mode and end output of the second application 1310*b*. In this case, the mobile terminal may end output of the button 1321*a*.

FIG. 13C is a diagram illustrating an embodiment of ending an output application after switching a display from a reduced display mode to an enlarged display mode through a button in a mobile terminal according to an embodiment of the present disclosure. The embodiment of FIG. 11C may be applied to the embodiment of FIG. 13C.

In an embodiment of the present disclosure, upon receiving a third signal 1330*c* for re-selecting the button 1321*a* after switching the display to the enlarged display mode based on the first signal 1330*a*, the mobile terminal may select the second application 1310*b* based on the third signal 1330*c*. If the third signal 1330*c* is dragged in a second direction, the mobile terminal may switch the display to the reduced display mode and end output the second application. This will now be described in detail.

The first drawing of FIG. 13C may correspond to the third drawing of FIG. 13A.

That is, referring to the first drawing of FIG. 13C, the mobile terminal may receive the third signal 1330*c* for re-selecting the button 1321*a* of a hidden state in a state in which the first application 1310*a* and the second application 1310*b* are being output in split regions in the enlarged display mode. The mobile terminal may re-output the button 1321*a* of the hidden state again according to the third signal 1330*c*.

Referring to the second drawing of FIG. 13C, the mobile terminal may receive the third signal 1330*c* of dragging the button 1321*a* in the second direction. In this case, a dragged distance of the third signal 1330*c* may exceed a first threshold value (not shown). Upon receiving the third signal 1330*c*, the mobile terminal may select the second application 1310*b*.

Referring to the third drawing of FIG. 13C, when the dragged distance of the third signal 1330*c* exceeds the first threshold value and the third signal 1330*c* is continuously dragged in the second direction, the mobile terminal may switch the display to the reduced display mode and completely end output of the second application 1310*b*. In this case, the third signal 1330*c* may be a signal of dragging the button 1321*a* to an edge of the display.

Figure 14:
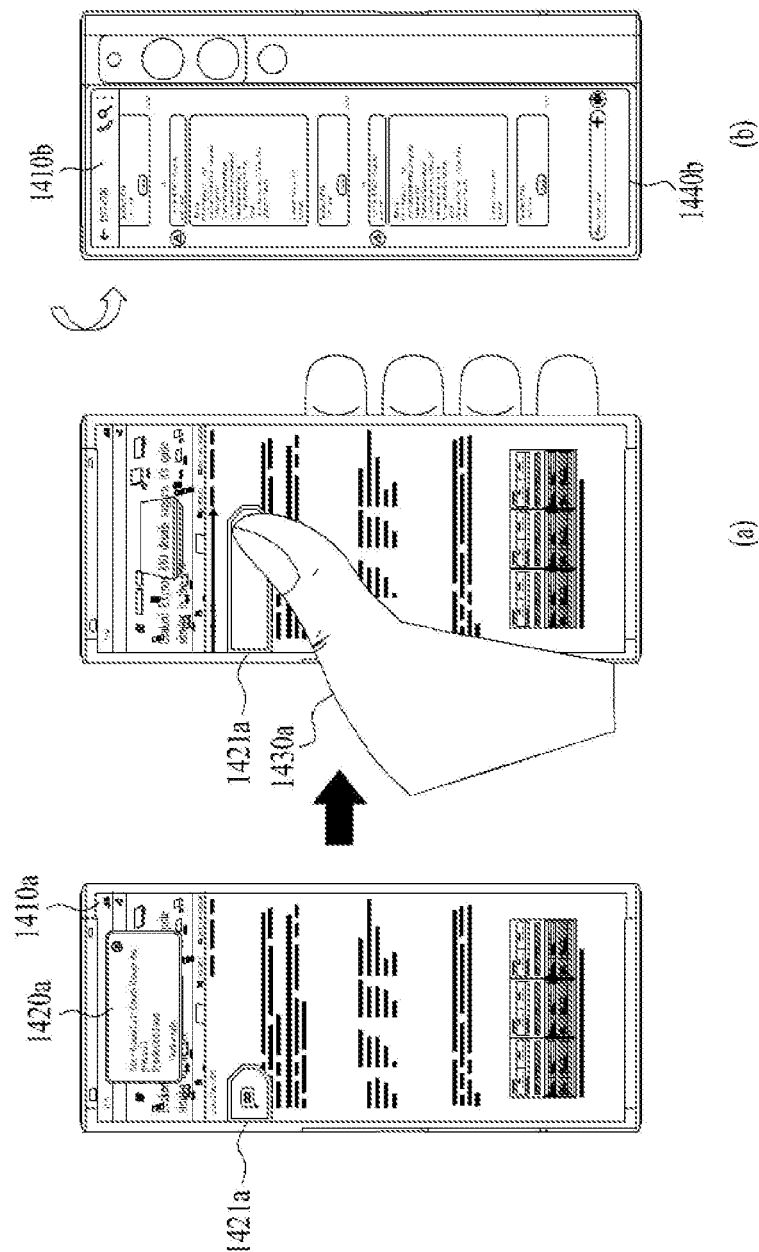
FIG. 14 is a diagram illustrating an embodiment of outputting an application in a rear face of a body in a mobile terminal according to an embodiment of the present disclosure.

FIG. 14 is a diagram illustrating an embodiment of outputting an application in a rear face of a body in a mobile terminal according to an embodiment of the present disclosure.

The first drawing of FIG. 14 may correspond to the above-described drawing. That is, referring to the first drawing of FIG. 14, the mobile terminal may output a first application 1410*a* in the reduced display mode. The mobile terminal may receive a notification related to a second application 1410*b*. Upon receiving the notification, the mobile terminal may output a message pop-up window 1420*a* and a button 1421*a* corresponding to the notification at a preset position.

Referring to FIG. 14(*a*), the mobile terminal may receive a first signal 1430*a* of dragging the button 1421*a* in a first direction. Unlike the above-described embodiment, the embodiment of FIG. 14 may assume an embodiment in which the display is forced to be switched to the reduced display mode. That is, the mobile terminal may force the display to be switched to the reduced display mode by user setting or a default value.

Thereby, referring to FIG. 14(*b*), upon receiving the first signal 1430*a*, the mobile terminal may output the second application 1410*b* in a first region 1440*b*. The first region 1440*b* may be a display region viewed from a rear face of the mobile terminal.

That is, since the mobile terminal according to an embodiment of the present disclosure may have a display region even in the rear face of the body, the mobile terminal may output the second application 1410*b* in a rear display region upon receiving the first signal 1430*a*.

Figure 15:
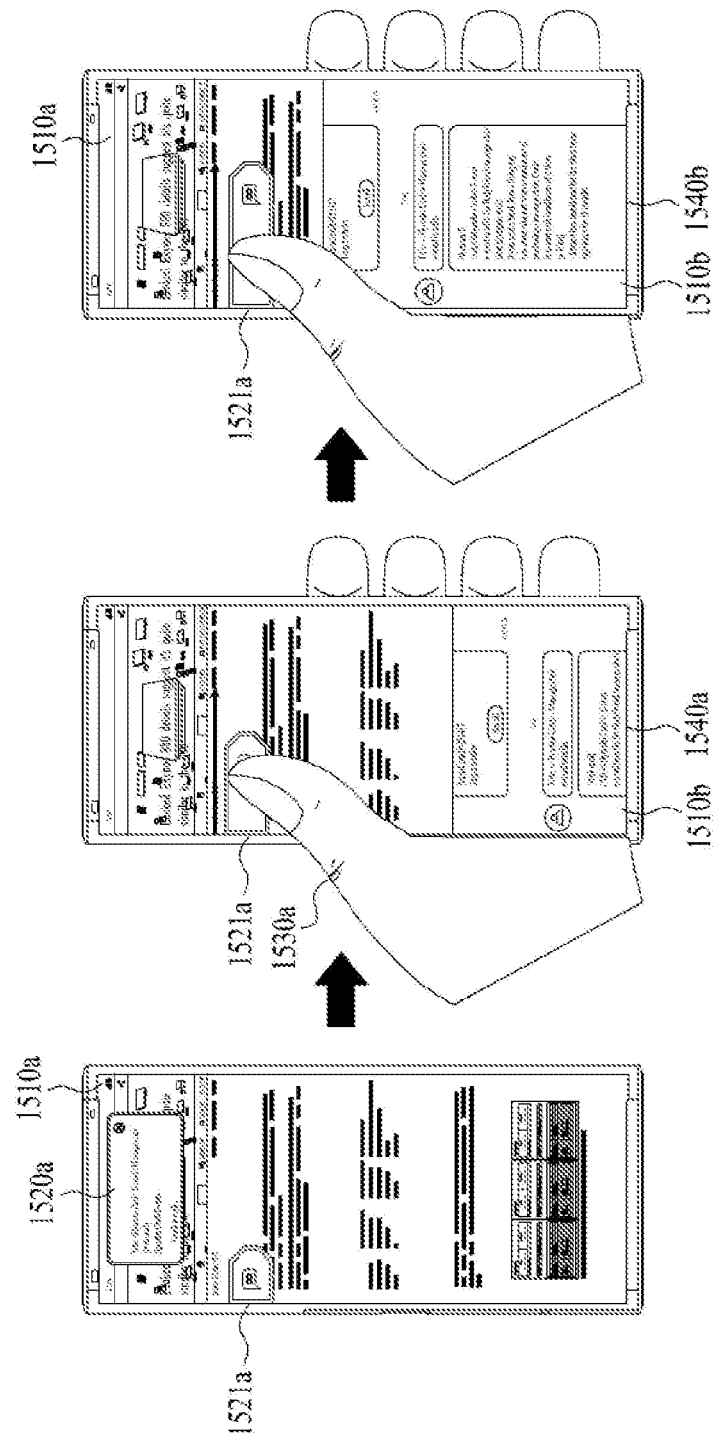
FIG. 15 is a diagram illustrating an embodiment of outputting an application in a lower region of a display in a mobile terminal according to an embodiment of the present disclosure.

FIG. 15 is a diagram illustrating an embodiment of outputting an application in a lower region of a display in a mobile terminal according to an embodiment of the present disclosure.

The first drawing of FIG. 15 may correspond to the first drawing of FIG. 14. That is, referring to the first drawing of FIG. 15, the mobile terminal may output a first application 1510*a* in the reduced display mode. The mobile terminal may receive a notification related to a second application 1510*b*. Upon receiving the notification, the mobile terminal may output a message pop-up window 1520*a* and a button 1521*a* corresponding to the notification.

Referring to the second drawing of FIG. 15, the mobile terminal may receive a first signal 1530*a* of dragging the button 1521*a* in a first direction. In this case, similar to the embodiment of FIG. 14, the embodiment of FIG. 15 may assume an embodiment in which the display is forced to be switched to the reduced display mode.

On the other hand, unlike the embodiment of FIG. 14, in the embodiment of FIG. 15, the mobile terminal may output a preview pop-up window 1540*a* corresponding to the second application 1510*b* in the lower region of the display upon receiving the first signal 1530*a*.

More specifically, the mobile terminal may output the preview pop-up window 1540*a* based on a dragged distance of the first signal 1530*a* as if the preview pop-up window 1540*a* rises from bottom to top of the mobile terminal.

Referring to the third drawing of FIG. 15, upon receiving the first signal 1530*a* of dragging the button 1521*a* to a first threshold value, the mobile terminal may output the second application 1510*b* in a first region 1540*b*. In this case, the first region 1540*b* may be a lower region of the display viewed from a front face of the body of the mobile terminal.

That is, unlike the above-described embodiment, when the display is forced to be switched to the reduced display mode, the mobile terminal may output the first application 1510*a* and the second application 1510*b* in regions generated by splitting a display region up and down.

Figure 16:
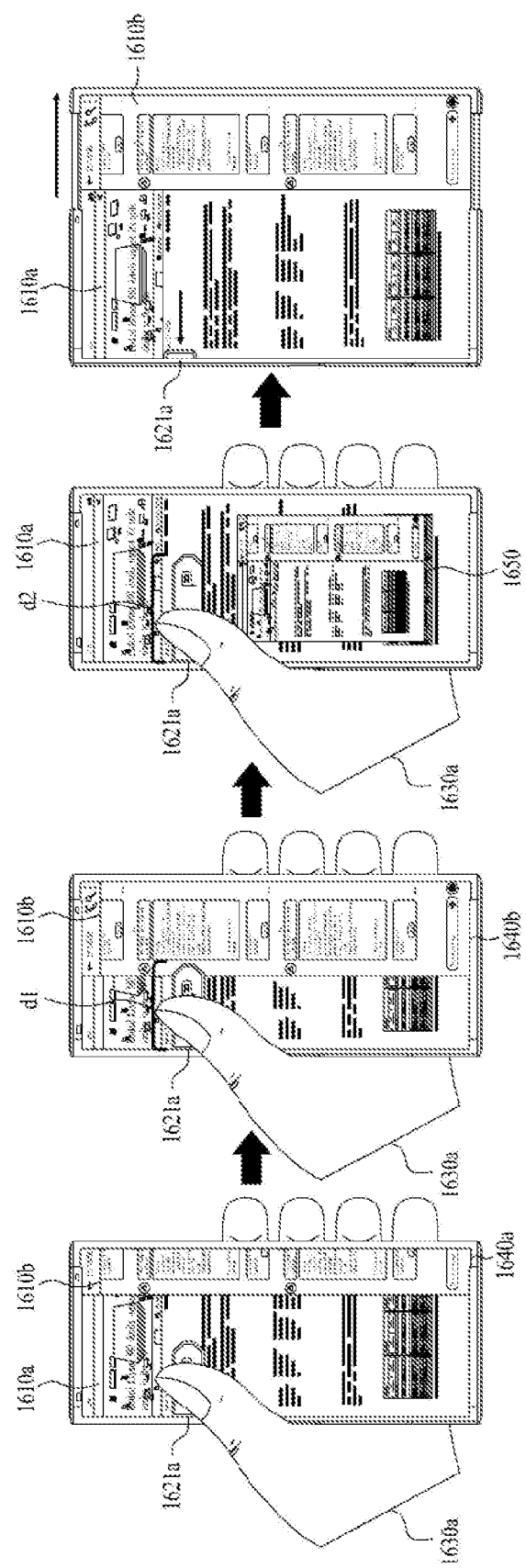
FIG. 16 is a diagram illustrating an embodiment of outputting a preview pop-up window in an enlarged display mode in a mobile terminal according to an embodiment of the present disclosure.

FIG. 16 is a diagram illustrating an embodiment of outputting a preview pop-up window in an enlarged display mode in a mobile terminal according to an embodiment of the present disclosure.

Referring to the first drawing of FIG. 16, the mobile terminal may output a first preview pop-up window 1640*a* of a second application 1610*b* corresponding to a notification (not shown) in the reduced display mode based on a signal 1630*a* of dragging a button 1621*a* corresponding to the notification.

Referring to the second drawing of FIG. 16, when the user drags the button 1621*a* in a first direction (e.g., from left to right) to a first threshold value d1, the mobile terminal may output the second application 1610*b* in a first region 1640*b* which is larger than the preview pop-up window 1640*a*.

Referring to the third drawing of FIG. 16, if the user drags the button 1621*a* to a second threshold value d2 in a state in which selection of the button 1621*a* is maintained, the mobile terminal may output a second preview pop-up window 1650 for outputting a first application 1610*a* and the second application 1610*b* in the enlarged display mode. Here, the second threshold value d2 may be a distance longer than the first threshold value d1.

That is, upon receiving the drag signal 1630*a* of a distance exceeding the second threshold d2 which is greater than the first threshold d1, the mobile terminal may output the second preview pop-up window 1650. The second preview pop-up window 1650 may indicate output of the first application 1610*a* and output of the second application 1610*b* in the enlarged display mode in a preview format.

In this case, the mobile terminal may maintain output of the second preview pop-up window 1650 while the signal 1630*a* is maintained. In this case, a blur effect may be applied to the first application 1610*a* which is being executed in a background.

Referring to the fourth drawing of FIG. 16, when the signal 1630*a* for selecting the button 1621*a* is released in a state in which the second preview pop-up window 1650 is output, the mobile terminal may switch the display to the enlarged display mode and output the first application 1610*a* and the second application 1610*b* in the same manner as content output on the second preview pop-up window 1650. In this case, the mobile terminal may output the button 1621*a* in a hidden state.

On the other hand, in the third drawing of FIG. 16, when the signal 1630*a* for selecting the button 1621*a* is dragged in a second direction (e.g., from right to left) while the signal 1630*a* is maintained in a state in which the second preview pop-up window 1650 is output, the mobile terminal may return to the state of the second drawing of FIG. 16. In this case, the second direction may be a direction opposite to the first direction.

That is, when the signal 1630a for selecting the button 1621a is released in a state in which the second preview pop-up window 1650 is output, the mobile terminal may perform the embodiment of the fourth drawing of FIG. 16 or return to the second drawing of FIG. 16 in a state in which the button 1621a is not released.

Hereinafter, an embodiment in which a mobile terminal operates in a landscape mode will be described with reference to FIGS. 17A and 17B.

Figure 17A:
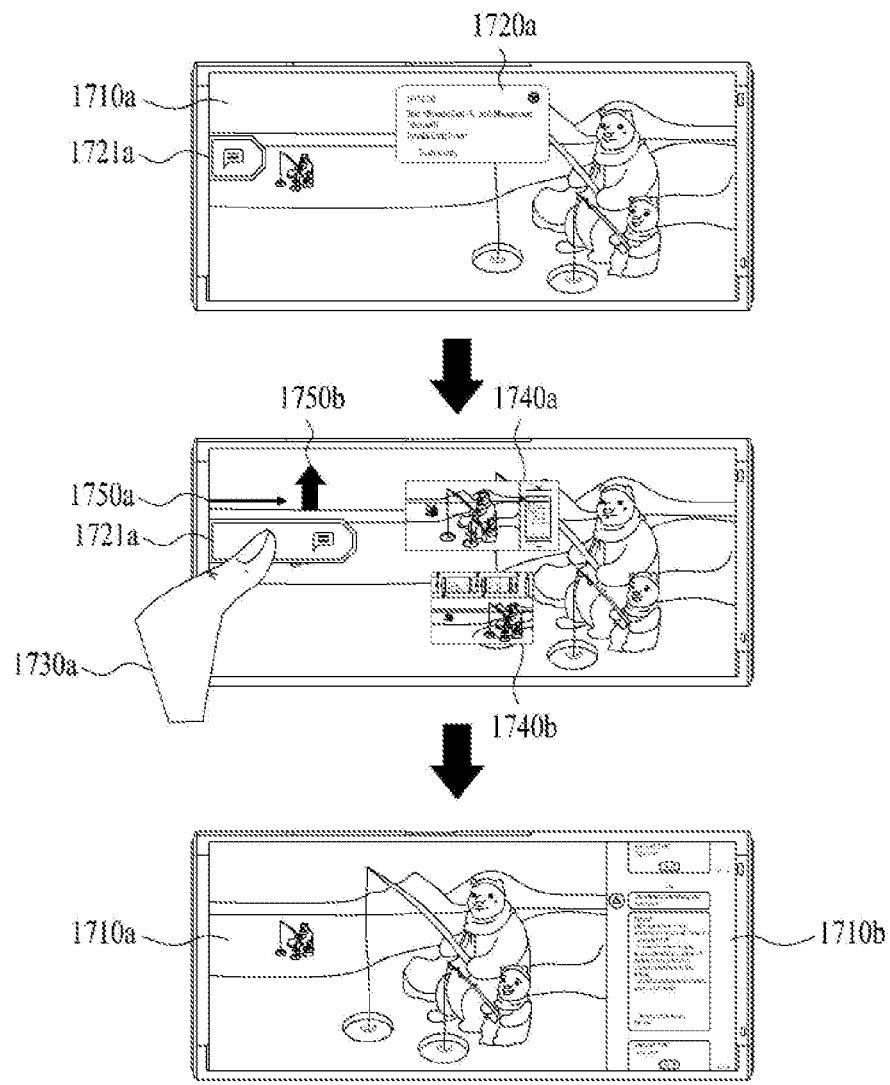
FIGS. 17A and 17B are diagrams illustrating an embodiment of outputting an application based on a preview pop-up window in a mobile terminal according to an embodiment of the present disclosure.
Figure 17B:
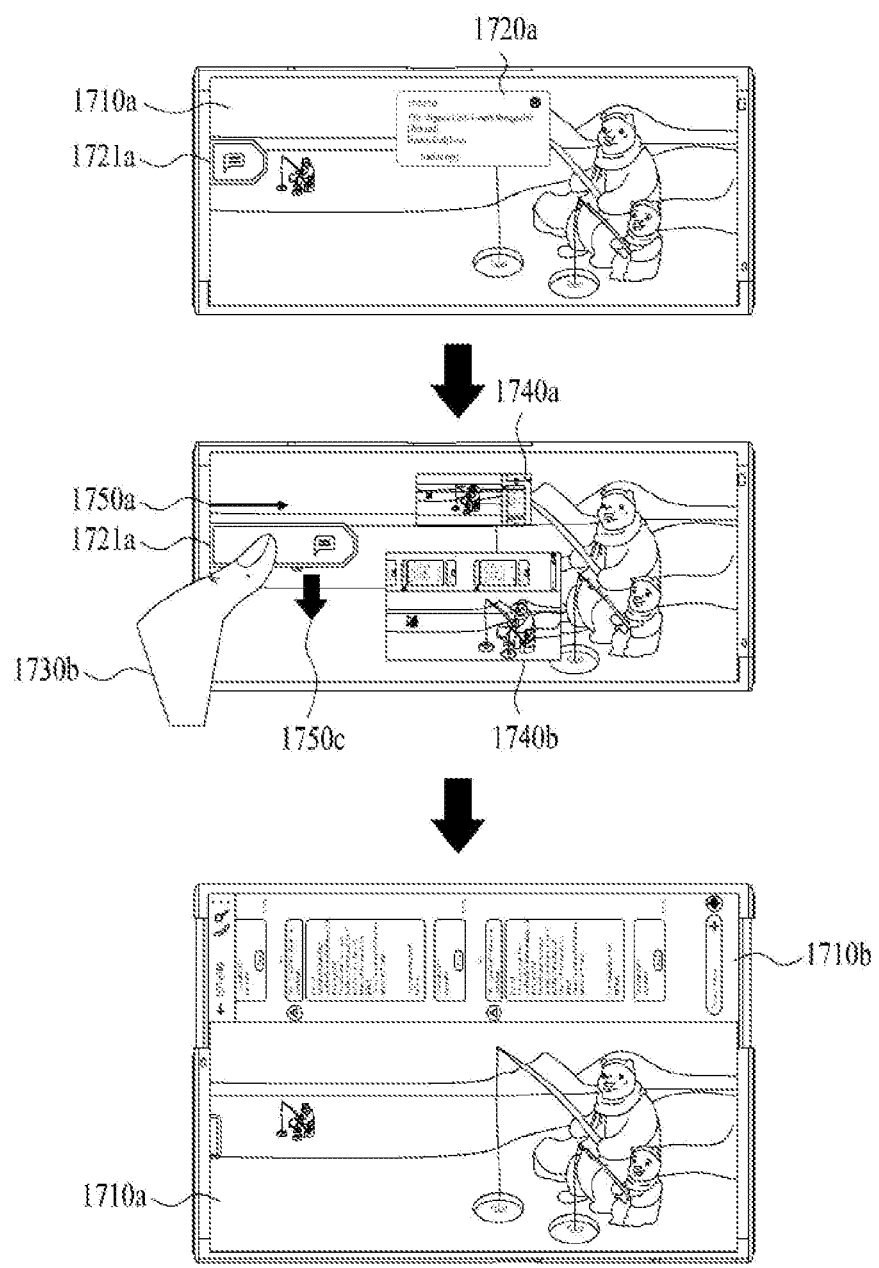

FIGS. 17A and 17B are diagrams illustrating an embodiment of outputting an application based on a preview pop-up window in a mobile terminal according to an embodiment of the present disclosure.

FIG. 17A illustrates an embodiment of outputting applications left and right in a landscape mode and FIG. 17B illustrates an embodiment of outputting applications up and down in a landscape mode.

Referring to the first drawing of FIG. 17A, the mobile terminal may output a first application 1710a in a landscape mode in which the display is reduced. Upon receiving a notification corresponding to a second application 1710b while the first application 1710a is being output, the mobile terminal may output a message pop-up window 1720a and a button 1721a corresponding to the notification.

Referring to the second drawing of FIG. 17A, the mobile terminal may output a first preview pop-up window 1740a and a second preview pop-up window 1740b based on a first signal (not shown) of dragging the button 1721a in a first direction 1750a.

Here, the first preview pop-up window 1740a may represent a mode in which the first application 1710a and the second application 1710b are output in regions split left and right in the landscape mode and the second preview pop-up window 1740b may represent a mode in which the first application 1710a and the second application 1710b are output in regions split up and down in the landscape mode.

In an embodiment of the present disclosure, upon outputting the first preview pop-up window 1740a and the second preview pop-up window 1740b based on the first signal, the mobile terminal may apply a blur effect to the first application 1710a which is being output in a background.

Referring to the third drawing of FIG. 17A, the mobile terminal may determine that the user selects the first preview pop-up window 1740a based on a second signal 1730a of dragging the button 1721a in a second direction 1750b. In this case, the mobile terminal may output the first preview pop-up window 1740a to be larger than the second preview pop-up window 1740b based on the second signal 1730a.

The mobile terminal may output the first application 1710a and the second application 1710b in regions slit left and right according to the second signal 1730a. For example, the mobile terminal may output the first application 1710a in a left region and the second application 1710b in a right region.

Hereinafter, an embodiment of selecting the second preview pop-up window 1740b will be described.

The first drawing of FIG. 17B corresponds to the first drawing of FIG. 17A. That is, referring to the first drawing of FIG. 17B, the mobile terminal may output the first application 1710a in the landscape mode in which the display is reduced. Upon receiving a notification corresponding to the second application 1710b while the first application 1710a is being output, the mobile terminal may output the message pop-up window 1720a and the button 1721a corresponding to the notification.

Referring to the second drawing of FIG. 17B, the mobile terminal may output the first preview pop-up window 1740a and the second preview pop-up window 1740b based on a first signal (not shown) of dragging the button 1721a in the first direction 1750a.

Here, the first preview pop-up window 1740a may represent a mode in which the first application 1710a and the second application 1710b are output in regions split left and right in the landscape mode and the second preview pop-up window 1740b may represent a mode in which the first application 1710a and the second application 1710b are output in regions split up and down in the landscape mode.

Referring to the third drawing of FIG. 17B, the mobile terminal may determine that the user selects the second preview pop-up window 1740b based on a third signal 1730b of dragging the button 1721a in a third direction 1750c. In this case, the mobile terminal may output the second preview pop-up window 1740b to be larger than the first preview pop-up window 1740a based on the third signal 1730b.

The mobile terminal may output the first application 1710a and the second application 1710b in regions split up and down according to the third signal 1730c. For example, the mobile terminal may output the first application 1710a in an upper region and the second application 1710b in a lower region.

In addition, in an embodiment of the present disclosure, upon outputting the first application 1710a and the second application 1710b in the regions split up and down according to the third signal 1730c, the mobile terminal may switch the display to the enlarged display mode.

FIG. 18 is a flowchart illustrating an embodiment of outputting a preview pop-up window for an application corresponding to a notification in a mobile terminal according to an embodiment of the present disclosure. Each step of FIG. 18 described below may be controlled by the controller of FIG. 1.

In particular, the mobile terminal performing a control method of FIG. 18 characteristically includes a display coupled to a body so that a display region viewed from a front face of the body is changeable according to switching between the enlarged display mode and the reduced display mode.

In step S1810, the mobile terminal may receive a notification while a first application is being output on the display. Here, the notification may indicate a phone call or a text message received from the mobile terminal.

In step S1820, the mobile terminal may output a message pop-up window and a button corresponding to the notification. Here, a position at which the button is output may be determined based on a region of a user touch signal input on the display for a preset time. This is as described above with reference to FIG. 10E.

In step S1830, the mobile terminal may receive a signal for selecting the button. Here, the signal may be a user input signal of touching and then dragging the button.

In step S1840, the mobile terminal may output a preview pop-up window for a second application corresponding to the notification based on a signal for selecting the button. Here, the signal may correspond to a user input signal of selecting and then dragging the button in a preset direction.

In particular, in an embodiment of the present disclosure, the mobile terminal may output the preview pop-up window in a direction opposite to a direction of selecting and then dragging the button. This is as described above in the above drawings.

In step S1850, when a dragged distance according to the signal exceeds a first threshold value, the mobile terminal may output the second application in a first region. That is, when the dragged distance according to the signal exceeds the first threshold value, the mobile terminal may independently output the second application in the first region and, when the dragged distance does not exceed the first threshold value, the mobile terminal may output the second application in the pop-up window.

Thereby, while the first application is being used, the user may temporarily check the second application corresponding to the notification through the preview pop-up window or may output the second application in a separate region. That is, the user may select an output manner of the second application corresponding to the notification while the first application is being used.

In an embodiment of the present disclosure, the first region may be a display region viewed from a rear face of the body. In another embodiment, upon receiving a signal in the reduced display mode, the mobile terminal may switch the display to the enlarged display mode based on the signal and the first region may be a display region viewed from a front face of the body. In this case, the mobile terminal may determine the position of the first region based on an input direction of the signal.

Although not shown in the drawing, in another embodiment, the mobile terminal may output the first application in a display region viewed from a rear face of the body and output the application corresponding to the notification in a display region viewed from a front face of the body.

The embodiments described above with reference to FIGS. 10A to 17D may be performed as the control method of the mobile terminal as illustrated in FIG. 18.

Effects of the mobile terminal according to the present disclosure and the control method therefor are as follows.

According to at least one of the embodiments of the present disclosure, the mobile terminal may output a preview pop-up window for an application corresponding to a notification upon receiving a signal for selecting a button corresponding to the notification, so that a user may check the notification through the preview pop-up window without stopping tasks that have been executed.

According to at least one of the embodiments of the present disclosure, the mobile terminal may output an application corresponding to a notification in a split region, so that a user may perform activities for the notification without affecting tasks that have been executed.

The above-described present disclosure may be implemented as computer-readable code on a computer-readable medium in which a program is recorded. The computer-readable medium may be any type of recording device in which data that may be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer may include the controller 180 of the terminal. It will be apparent to those skilled in the art that various modifications and variations may be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

The present disclosure is industrially applicable to a mobile terminal and is repeatedly applicable to the mobile terminal.

What is claimed is:

1. A mobile terminal comprising:
    a body;
    a transceiver configured to externally transmit or receive a signal;
    a display coupled to the body, wherein a display region viewable from a front of the body is variable according to switching between an enlarged display mode and a reduced display mode, wherein the display includes a flexible display surrounding the front, a side, and a rear of the body; and
    a processor,
    wherein the processor is configured to:
    move a display portion positioned at the side of the body to the front of the body and move a display portion positioned at the rear of the body to the front of the body via the side of the body when the display is switched to the enlarged display mode;
    output a message pop-up window and a button both corresponding to a notification corresponding to a second application upon receiving the notification while a first application is being output at the display;
    receive input of a first signal corresponding to a touch selecting of the button;
    output a preview pop-up window for the second application while the input of the first signal is maintained; and
    if the first application is being output in the enlarged display mode, output the second application at a first region of the display in the enlarged display mode and output the first application at a second region of the display in the enlarged display mode when a dragged distance of the first signal exceeds a first threshold value,
    wherein the first application is being output in the reduced display mode, and
    wherein the processor is further configured to:
    switch the display to the enlarged display mode upon outputting the second application at the preview pop-up window based on the first signal or outputting the second application at the first region based on the first signal; and
    switch the display to the reduced display mode and end the output of the second application, when the input of the first signal is dragged in a fourth direction in a state in which the input of the first signal is not released, after the display is switched to the enlarged display mode based on the first signal.

2. The mobile terminal of claim 1, wherein the processor is further configured to reduce a size of the second region at which the first application has been output, when the input of the first signal is released in a state in which the second application is output at the first region.

3. The mobile terminal of claim 1, wherein the processor is further configured to end output of the second application at the first region based on receiving input of a second signal for selecting the button.

4. The mobile terminal of claim 1, wherein the preview pop-up window is output at a preset region in a first direction that is opposite to a drag direction of the first signal.

5. The mobile terminal of claim 1, wherein the processor is further configured to:
    receive input of a third signal for selecting the button in a second direction in a state in which the second application is output at the first region;

split the first region into a first partial region and a second partial region based on the third signal; and output the second application and a third application at the first partial region and the second partial region, respectively, the first region being split based on the second direction.

6. The mobile terminal of claim 1, wherein the processor is further configured to:

receive input of a fourth signal for re-selecting the button in a state in which the second application is output at the first region;

select the second application based on the fourth signal; and end the output of the second application when the input of the fourth signal is dragged in a third direction.

7. The mobile terminal of claim 6, wherein a dragged distance of the fourth signal exceeds the first threshold value.

8. The mobile terminal of claim 1, wherein the first application is being output in the enlarged display mode.

9. The mobile terminal of claim 1, wherein the processor is further configured to:

receive input of a fifth signal for re-selecting the button after the display is switched to the enlarged display mode based on the first signal;

select the second application based on the fifth signal; and switch the display to the reduced display mode and end the output of the second application, when the input of the fifth signal is dragged in the fourth direction.

10. The mobile terminal of claim 1, wherein the first region is a display region viewable from the rear of the body.

11. The mobile terminal of claim 1, wherein the first region is a lower region of the display viewable from the front of the body.

12. The mobile terminal of claim 1, wherein the processor is further configured to:

output a preview pop-up window for the enlarged display mode to output the first application and the second application, when the dragged distance of the first signal exceeds a second threshold value; and switch the display to the enlarged display mode and output the first application and the second application at the display, when the input of the first signal is released.

13. The mobile terminal of claim 1, wherein the processor is further configured to:

output a first preview pop-up window and a second preview pop-up window for the first application and the second application based on the first signal, when the mobile terminal operates in a landscape mode;

select one of the first preview pop-up window or the second preview pop-up window based on a direction of input of a sixth signal for selecting the button; and output the first application and the second application at the display based on the selected preview pop-up window.

14. The mobile terminal of claim 1, wherein a position at which the button is output is determined based on a region of a user touch signal input on the display for a preset time period.

15. The mobile terminal of claim 1, wherein the processor is further configured to end the output of the button when a preset time elapses after receiving the notification.

16. A method of controlling a mobile terminal including a display coupled to a body, wherein a display region viewable from a front of the body is variable according to switching between an enlarged display mode and a reduced display mode, wherein the display includes a flexible display surrounding the front, a side, and a rear of the body, the method comprising:

moving a display portion positioned at the side of the body to the front of the body and moving a display portion positioned at the rear of the body to the front of the body via the side of the body when the display is switched to the enlarged display mode;

receiving a notification corresponding to a second application while a first application is being output at the display;

outputting a message pop-up window and a button both corresponding to the notification;

outputting a preview pop-up window for the second application based on receiving input of a signal corresponding to a touch selecting of the button; and outputting the second application at a first region of the display in the enlarged display mode and outputting the first application at a second region of the display in the enlarged display mode when a dragged distance of the signal exceeds a first threshold value if the first application is being output in the enlarged display mode, wherein the first application is being output in the reduced display mode, and wherein the method further comprises:

switching the display to the enlarged display mode upon outputting the second application at the preview pop-up window based on the signal or outputting the second application at the first region based on the signal; and switching the display to the reduced display mode and ending the output of the second application, when the input of the signal is dragged in a direction in a state in which the input of the signal is not released, after the display is switched to the enlarged display mode based on the signal.

* * * * *

UNITED STATES PATENT AND TRADEMARK OFFICE
CERTIFICATE OF CORRECTION

| | |
|---|---|
| PATENT NO. | : 11,635,882 B2 |
| APPLICATION NO. | : 17/033534 |
| DATED | : April 25, 2023 |
| INVENTOR(S) | : Kensin Noh et al. |

It is certified that error appears in the above-identified patent and that said Letters Patent is hereby corrected as shown below:

On the Title Page

Insert:
--(30) Foreign Application Priority Data
Aug. 19, 2020 (WO) PCT/KR2020/011032--

Signed and Sealed this
Fourteenth Day of November, 2023

Katherine Kelly Vidal
*Director of the United States Patent and Trademark Office*